(12) United States Patent
Ito

(10) Patent No.: US 12,506,465 B2
(45) Date of Patent: Dec. 23, 2025

(54) RADIO FREQUENCY MODULE

(71) Applicant: Murata Manufacturing Co., Ltd., Nagaokakyo (JP)

(72) Inventor: Takanori Ito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 301 days.

(21) Appl. No.: 18/483,531

(22) Filed: Oct. 10, 2023

(65) Prior Publication Data
US 2024/0204750 A1    Jun. 20, 2024

(30) Foreign Application Priority Data

Dec. 14, 2022    (JP) .................................. 2022-199403

(51) Int. Cl.
*H03H 9/25* (2006.01)
*H03H 9/64* (2006.01)
*H03H 9/72* (2006.01)
*H04B 1/04* (2006.01)

(52) U.S. Cl.
CPC ............ *H03H 9/25* (2013.01); *H03H 9/6483* (2013.01); *H03H 9/725* (2013.01); *H04B 1/0483* (2013.01)

(58) Field of Classification Search
CPC ........ H03H 9/25; H03H 9/6483; H03H 9/725; H04B 1/0483

USPC ....................................................... 455/552.1
See application file for complete search history.

(56) References Cited

U.S. PATENT DOCUMENTS

| | | | |
|---|---|---|---|
| 11,563,423 B2 * | 1/2023 | Komatsu | H03H 9/02102 |
| 2019/0097605 A1 * | 3/2019 | Nosaka | H03H 9/542 |
| 2019/0334563 A1 * | 10/2019 | Elbrecht | H04B 1/0057 |
| 2020/0252042 A1 * | 8/2020 | Mori | H03H 1/00 |

FOREIGN PATENT DOCUMENTS

WO    2016/136413 A1    9/2016

* cited by examiner

*Primary Examiner* — Michael R Neff
(74) *Attorney, Agent, or Firm* — XSENSUS LLP

(57) ABSTRACT

A radio frequency module includes a filter having plural serial arm resonators and one or more parallel arm resonators, an inductor connected to a second path connecting an input/output terminal to the filter, and a parallel arm circuit connected between the ground and a first parallel arm resonator among the one or more parallel arm resonators. The parallel arm circuit includes inductors and a switch having a common terminal, selection terminals. The selection terminal is connected to a first end of the inductor. The selection terminal is connected to a first end of the inductor. The common terminal is connected to the first parallel arm resonator. The inductor and the inductor are connected, at their second ends, to the ground.

20 Claims, 12 Drawing Sheets

ASSUMING ATTENUATION OF Band7-Rx IS TO BE PRIORITIZED

ASSUMING ATTENUATION OF Band3-Rx IS TO BE PRIORITIZED

ASSUMING ATTENUATION OF Band7-Rx IS TO BE PRIORITIZED
(MAGNETIC FIELD COUPLING BETWEEN INDUCTOR 20 AND INDUCTOR 30)

RADIO FREQUENCY MODULE

CROSS-REFERENCE TO RELATED APPLICATION

This application claims priority to Japanese Patent Application No. JP 2022-199403 filed on Dec. 14, 2022. The entire contents of the above-identified applications, including the specifications, drawings and claims, are incorporated herein by reference in their entirety.

BACKGROUND OF THE DISCLOSURE

1. Field of the Disclosure

The present disclosure relates to a radio frequency module.

2. Description of the Related Art

International Publication No. 2016/136413 discloses a radio frequency module including an acoustic-wave transmit filter and a receive filter which are connected to a common terminal. Electromagnetic field coupling occurs between a first inductor, which is connected between the ground and a parallel arm resonator of the acoustic-wave transmit filter, and an inductor of a matching circuit. This improves the attenuation characteristics of the transmit filter.

Addition of an inductor between a parallel arm resonator of an acoustic-wave filter and the ground improves the attenuation in a specific attenuation band without an increase of the transmission loss in the passband of the acoustic-wave filter.

However, with the development of the multiband technology, assuming a filter which operates simultaneously with the acoustic-wave filter is changed or assuming the frequency, power, or the like of signals passing through the acoustic-wave filter is changed, either one or both of the attenuation band and the attenuation need to be changed while good attenuation characteristics of the acoustic-wave filter are achieved.

SUMMARY OF THE DISCLOSURE

The present disclosure is made to solve the issue, and an object thereof is to provide a radio frequency module including an acoustic-wave filter having variable attenuation characteristics.

To attain the object, a radio frequency module according to an aspect of the present disclosure includes a first input/output terminal and a second input/output terminal, an acoustic-wave filter, a first inductor, and a parallel arm circuit. The acoustic-wave filter has plural serial arm resonators and one or more parallel arm resonators. The plural serial arm resonators are serially disposed on a first path connecting the first input/output terminal to the second input/output terminal. The one or more parallel arm resonators are connected between the first path and the ground. The first inductor is connected to a second path connecting the first input/output terminal or the second input/output terminal to the acoustic-wave filter. The parallel arm circuit is connected between the ground and a first parallel arm resonator among the one or more parallel arm resonators. The parallel arm circuit includes a second inductor, a third inductor, and a switch that has a common terminal, a first selection terminal, and a second selection terminal. The first selection terminal is connected to a first end of the second inductor. The second selection terminal is connected to a first end of the third inductor. The common terminal is connected to either one of the first parallel arm resonator and the ground. The second inductor and the third inductor are connected, at second ends thereof, to the other one of the first parallel arm resonator and the ground.

The present disclosure enables a radio frequency module, which includes an acoustic-wave filter having variable attenuation characteristics, to be provided.

DESCRIPTION OF THE PREFERRED EMBODIMENTS

Figure 1:
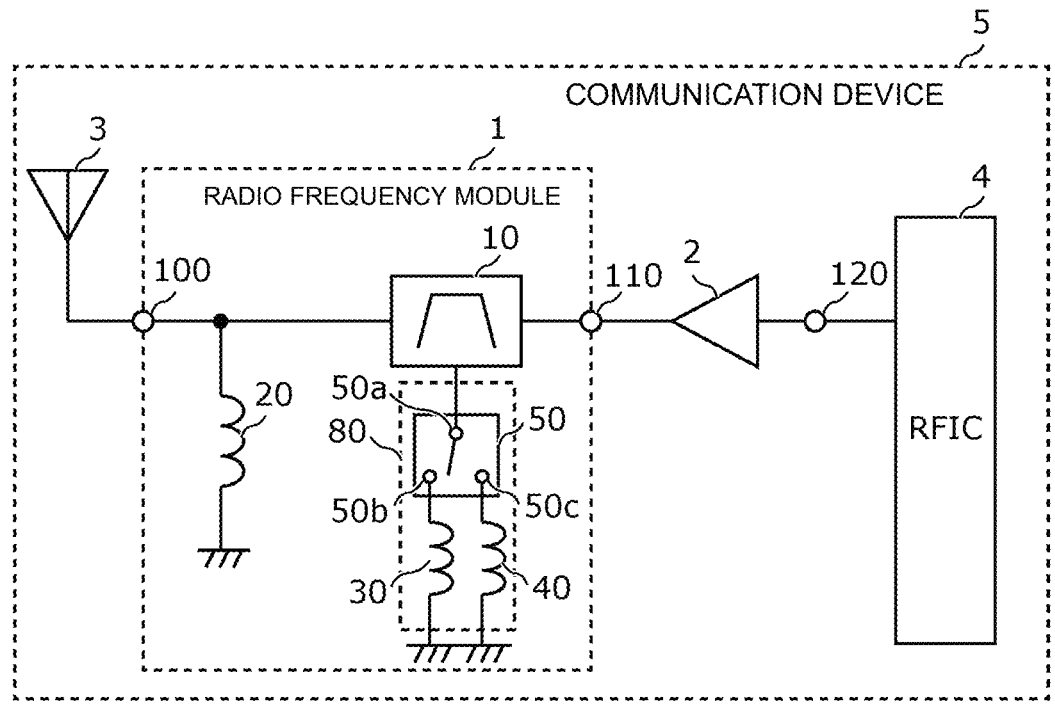
FIG. 1 is a diagram illustrating the circuit configuration of a radio frequency module and a communication device according to an embodiment.

Embodiments of the present disclosure will be described below in detail. The embodiments below each describe a comprehensive or specific example. Values, shapes, materials, components, the arrangement and the connection forms of components, and the like, which are described in the embodiments below, are exemplary, and are not intended to limit the present disclosure. Among components in an embodiment example and modified examples below, components that are not described in independent claims are described as optional components. The sizes or the ratios in size of the components illustrated in the drawings are not necessarily strict. In the figures, substantially the same configurations are designated with identical reference numerals. Repeated description may be avoided or simplified.

In the present disclosure, terms indicating the relationship between components, such as parallel and perpendicular, terms indicating the shapes of components, such as rectangular, and numerical ranges do not represent only strict meaning, and mean substantially equivalent ranges, for example, having errors in the order of a few percent.

In the present disclosure, "to be connected" encompasses, not only the case of direct connection using connection terminals and/or wiring conductors, but also the case of electrical connection via other circuit devices. "To be connected between A and B" may include connection to A and B on a path connecting A to B.

In the present disclosure, plan view of a substrate may include that the substrate and circuit devices mounted on the substrate are viewed through orthogonal projection onto a plane parallel to a principal surface of the substrate.

In a component layout in the present disclosure, "to dispose a component on/in a substrate" encompasses placement of the component on a principal surface of the substrate and placement of the component in the substrate. "To dispose a component on a principal surface of a substrate" encompasses, in addition to placement of the component on the principal surface of the substrate, placement of the component above the principal surface without contact with the principal surface (for example, stacking the component on a different component which is disposed on the principal surface). "To dispose a component on a principal surface of a substrate" may encompass placement of the component in a recess formed on the principal surface. "To dispose a component in a substrate" encompasses, in addition to the component encapsulated in the module substrate, the component, all of which is disposed between the principal surfaces of the substrate but a part of which is not covered by the substrate, and the component, only a part of which is disposed in the substrate.

In the present disclosure, a "path" may include a transmission line formed, for example, of wiring through which radio frequency signals are propagated, an electrode which is directly connected to the wiring, and a terminal connected directly to the wiring or the electrode.

In the present disclosure, "component A disposed serially to path B" may include that the signal input end and the signal output end of component A are connected either to wiring, an electrode, or a terminal included in path B.

In the component layout in the present disclosure, the state in which circuit device A (or wiring A) and circuit device B (or wiring B) are disposed adjacent to each other (or are adjacent to each other) may include that other circuit devices (and wiring) are not disposed between circuit device A (or wiring A) and circuit device B (or wiring B).

Embodiment

1. Configuration of a Radio Frequency Module 1 and a Communication Device 5

The circuit configuration of a radio frequency module 1 and a communication device 5 according to the present embodiment will be described by referring to FIG. 1. FIG. 1 is a diagram illustrating the circuit configuration of the radio frequency module 1 and the communication device 5 according to the embodiment. As illustrated in FIG. 1, the communication device 5 according to the present embodiment includes the radio frequency module 1, a power amplifier 2, an antenna 3, and a radio frequency (RF) signal processing circuit (radio frequency integrated circuit (RFIC)) 4.

The radio frequency module 1 transmits radio frequency signals between the antenna 3 and the RFIC 4. The detailed circuit configuration of the radio frequency module 1 will be described below.

The power amplifier 2 is connected, at its input end, to the RFIC 4 through a signal input terminal 120, and is connected, at its output end, to the radio frequency module 1. The power amplifier 2 amplifies transmit signals. Alternatively, the power amplifier 2 may be a low-noise amplifier which amplifies receive signals received by the antenna 3 and having passed through the radio frequency module 1.

The antenna 3, which is connected to the radio frequency module 1, transmits radio frequency signals which are output from the radio frequency module 1. The antenna 3 may receive radio frequency signals from the outside for output to the radio frequency module 1.

The RFIC 4 is an exemplary signal processing circuit which processes radio frequency signals. Specifically, the RFIC 4 performs signal processing, including upconverting, on transmit signals received from a baseband signal processing circuit (BBIC) (not illustrated), and outputs the transmit signals, which are generated through the signal processing, to a transmit path of the radio frequency module 1. The RFIC 4 may perform signal processing, including down-converting, on receive signals received through a receive path of the radio frequency module 1, and may output the receive signals, which are generated through the signal processing, to the BBIC.

The RFIC 4 also has functions as a controller which controls switching of connection in a switch 50 of the radio frequency module 1 and which controls the power supply voltage and the bias voltage (current) which are supplied to the power amplifier 2. Some or all the functions, as a controller, of the RFIC 4 may be implemented outside the RFIC 4, and, for example, may be implemented in the BBIC or the radio frequency module 1.

In the communication device 5 according to the present embodiment, the antenna 3 is not a necessary component.

The circuit configuration of the radio frequency module 1 will be described. As illustrated in FIG. 1, the radio frequency module 1 includes a filter 10, an inductor 20, a parallel arm circuit 80, and input/output terminals 100 and 110.

The input/output terminal 100, which is an exemplary first input/output terminal, is connected to the filter 10 and the antenna 3. The input/output terminal 110, which is an exemplary second input/output terminal, is connected to the filter 10 and the power amplifier 2.

The filter 10, which is an exemplary acoustic-wave filter, is connected, at its input end, to the input/output terminal 110, and is connected, at its output end, to the input/output terminal 100. The filter 10 has plural serial arm resonators, which are serially disposed on a first path connecting the input/output terminals 100 and 110 to each other, and one or more parallel arm resonators, which are connected between the first path and the ground. Each of the plural serial arm resonators and the one or more parallel arm resonators is an acoustic-wave resonator. Acoustic-wave resonators include, for example, a surface acoustic wave resonator, in which interdigital transducer (IDT) electrodes are formed on a substrate having piezoelectricity, and a bulk-acoustic-wave resonator, which has a structure in which a piezoelectric film is sandwiched between opposing plane electrodes.

The inductor 20, which is an exemplary first inductor, is connected between the ground and a second path connecting the input/output terminal 100 to the filter 10. The inductor 20 may be connected between the ground and the second path connecting the input/output terminal 110 to the filter 10. The inductor 20 may be serially disposed on the second path.

The parallel arm circuit 80 is connected between the ground and a first parallel arm resonator among the one or more parallel arm resonators included in the filter 10. The parallel arm circuit 80 includes inductors 30 and 40 and the switch 50. The switch 50 has a common terminal 50a, a selection terminal 50b (first selection terminal), and a selection terminal 50c (second selection terminal). The common terminal 50a is connected to the first parallel arm resonator. The inductor 30, which is an exemplary second inductor, is connected, at its first end, to the selection terminal 50b, and is connected, at its second end, to the ground. The inductor 40, which is an exemplary third inductor, is connected, at its first end, to the selection terminal 50c, and is connected, at its second end, to the ground.

The switch 50 is capable of switching between connection and disconnection between the common terminal 50a and the selection terminal 50b, and is capable of switching between connection and disconnection between the common terminal 50a and the selection terminal 50c. Accordingly, the radio frequency module 1 may achieve (1) connection between the filter 10 and the inductor 30 and disconnection between the filter 10 and the inductor 40, (2) disconnection between the filter 10 and the inductor 30 and connection between the filter 10 and the inductor 40, (3) connection between the filter 10 and the inductor 30 and connection between the filter 10 and the inductor 40, and (4) disconnection between the filter 10 and the inductor 30 and disconnection between the filter 10 and the inductor 40.

The parallel arm circuit 80 may have a configuration in which the inductors 30 and 40 are connected on the filter 10 side and the switch 50 is connected on the ground side. Specifically, the inductor 30 may be connected, at its first end, to the selection terminal 50b; the inductor 40 may be connected, at its first end, to the selection terminal 50b; the common terminal 50a may be connected to the ground; the inductor 30 may be connected, at its second end, to the first parallel arm resonator; the inductor 40 may be connected at its second end, to the first parallel arm resonator.

According to the configuration of the radio frequency module 1, the inductor 30 and/or the inductor 40 are added between the first parallel arm resonator of the filter 10 and the ground. This achieves improvement of the attenuation in a specific attenuation band without an increase of the transmission loss in the passband of the filter 10. In this case, even assuming a filter which operates simultaneously with the filter 10 is changed, or even assuming the frequency, power, or the like of signals passing through the filter 10 is changed, the inductors 30 and 40 enable either one or both of the attenuation band and the attenuation to be changed while the low loss in the passband of the filter 10 is maintained. Therefore, the radio frequency module 1 including an acoustic-wave filter having variable attenuation characteristics may be provided.

Figure 2:
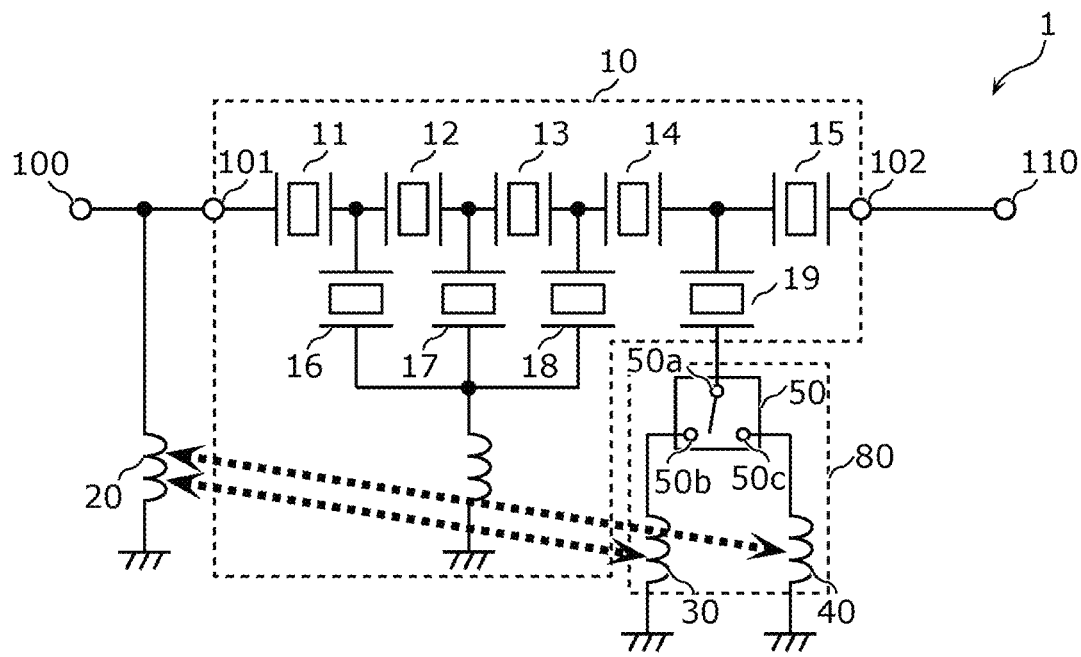
FIG. 2 is a diagram illustrating a specific circuit configuration of a radio frequency module according to an embodiment.

A specific circuit configuration example of the radio frequency module 1 will be described. FIG. 2 is a diagram illustrating a specific circuit configuration of the radio frequency module 1 according to the embodiment.

As illustrated in FIG. 2, the filter 10 includes serial arm resonators 11, 12, 13, 14 and 15, parallel arm resonators 16, 17, 18 and 19, and terminals 101 and 102. Each of the serial arm resonators 11 to 15 is an acoustic-wave resonator serially disposed on a path connecting the terminals 101 and 102 to each other. The parallel arm resonator 16 is an acoustic-wave resonator connected between the ground and a path connecting the serial arm resonators 11 and 12 to each other. The parallel arm resonator 17 is an acoustic-wave resonator connected between the ground and a path connecting the serial arm resonators 12 and 13 to each other. The parallel arm resonator 18 is an acoustic-wave resonator connected between the ground and the path connecting the serial arm resonators 13 and 14 to each other. The parallel arm resonator 19 is an acoustic-wave resonator connected between the parallel arm circuit 80 and a path connecting the serial arm resonators 14 and 15 to each other. An inductor is connected between the ground and the parallel arm resonators 16, 17, and 18. The parallel arm circuit 80 is connected between the parallel arm resonator 19 and the ground. In the circuit example, the filter 10 forms a ladder acoustic-wave filter including five serial arm resonators and four parallel arm resonators.

In the circuit example, magnetic field coupling may occur between the inductor 20 and the inductor 30; magnetic field coupling may occur between the inductor 20 and the inductor 40. The configuration in which magnetic field coupling occurs between the inductor 20 and the inductor 30 or 40 will be described below.

In the radio frequency module 1 according to the present embodiment, the inductor 20 and the inductor 30 do not need to produce magnetic field coupling; the inductor 20 and the inductor 40 do not need to produce magnetic field coupling. Desirably, at least one of the inductors 30 and 40 is capable of producing magnetic field coupling with the inductor 20.

Assuming the common terminal 50a is connected to the selection terminal 50b, magnetic field coupling between the inductor 30 and the inductor 20 allows high frequency components through the inductors 30 and 20 to be made opposite in phase to radio frequency signals, which are transmitted from the terminal 102 to the terminal 101, in a first attenuation band. This achieves an increase of the attenuation, in the first attenuation band, of radio frequency signals transmitted from the terminal 102 to the terminal 101.

Assuming the common terminal 50a is connected to the selection terminal 50c, magnetic field coupling between the inductor 40 and the inductor 20 allows high frequency components through the inductors 40 and 20 to be made opposite in phase to radio frequency signals, which are transmitted from the terminal 102 to the terminal 101, in a second attenuation band. This achieves an increase of the attenuation, in the second attenuation band, of radio frequency signals transmitted from the terminal 102 to the terminal 101.

That is, even assuming a filter which operates simultaneously with the filter 10 is changed, or even assuming the frequency, power, or the like of signals passing through the filter 10 is changed, the inductors 30 and 40 enable either one or both of the attenuation band and the attenuation to be changed while the good bandpass characteristics and the good attenuation characteristics of the filter 10 are maintained. Therefore, the radio frequency module 1 including an acoustic-wave filter having variable attenuation characteristics may be provided.

Further, magnetic field coupling between the inductor 20 and at least one of the inductors 30 and 40 may add mutual inductance, which is generated by the magnetic field coupling with the inductor 20, to the inductance value of the inductor 30 and/or the inductance value of the inductor 40 which are necessary for improvement of the attenuation characteristics of the filter 10. Thus, the inductance value of the inductor 30 itself and/or the inductance value of the inductor 40 itself may be decreased. This achieves reductions in size of the inductors 30 and 40 and a reduction in size of the radio frequency module 1.

Desirably, the inductance value of the inductor 20 is greater than that of the inductor 30, and is greater than that of the inductor 40. Accordingly, the difference between the inductance value of the inductors 30 and 40, which is obtained in the case of not producing magnetic field coupling with the inductor 20, and the inductance value of the inductors 30 and 40, which is obtained in the case of producing magnetic field coupling with the inductor 20, may be made large, achieving a large width of change of the attenuation characteristics of the filter 10.

As in the present embodiment, assuming the inductor 20 is connected to the input/output terminal 100 among the input/output terminals 100 and 110 and assuming the filter 10 includes two or more parallel arm resonators, the parallel arm resonator 19 connected to the parallel arm circuit 80 is desirably connected to the path, connecting the terminals 101 and 102 to each other, at the farthest distance from the input/output terminal 100 among the parallel arm resonator 16 to 19.

According to this, the parallel arm circuit 80 is connected to the parallel arm resonator 19 which is connected closest to the output end of the power amplifier 2. Thus, a great signal strength of high frequency components received by the parallel arm circuit 80 may be achieved. Therefore, signals in a predetermined attenuation band which are transmitted from the terminal 102 to the terminal 101 may be canceled to a sufficient degree.

The parallel arm circuit 80 is desirably connected only to the parallel arm resonator 19 which is connected to the path, connecting the terminals 101 and 102 to each other, at the farthest distance from the input/output terminal 100 among the parallel arm resonator 16 to 19. According to this, only a single parallel arm circuit 80 is added to the filter 10. Thus, signals in the predetermined attenuation band which are transmitted from the terminal 102 to the terminal 101 may be canceled to a sufficient degree, and a small radio frequency module 1 may be provided. However, other connections are within the scope of the disclosure.

2. The Bandpass Characteristics of the Radio Frequency Module 1

The bandpass characteristics of the radio frequency module 1 which change due to switching of connection in the switch 50 will be described. In this example, the filter 10 has a passband of the uplink operation band (1920 MHz-1980 MHz) of Band 1, and the following cases are assumed: (1) the case in which the radio frequency module 1 transmits transmit signals in Band 1 and, at the same time, receives receive signals in Band 7 (first operation mode); (2) the case in which the radio frequency module 1 transmits transmit signals in Band 1 and, at the same time, receives receive signals in Band 3 (second operation mode).

In the present embodiment, each of Band 1, Band 3, and Band 7 is a frequency band used in a 4th Generation (4G)-long term evolution (LTE) system or a 5th Generation (5G)-new radio (NR) system. The frequency bands, to which the present embodiment is applied, are defined in advance for a communication system, which is constructed by using a 4G-LTE system, a 5G-NR system, or a radio access technology (RAT), for example, by a standardization organization (such as the 3rd Generation Partnership Project (3GPP)™ or the Institute of Electrical and Electronics Engineers (IEEE)). The frequency bands are not limited to Band 1, Band 3, and Band 7.

Figure 3A:
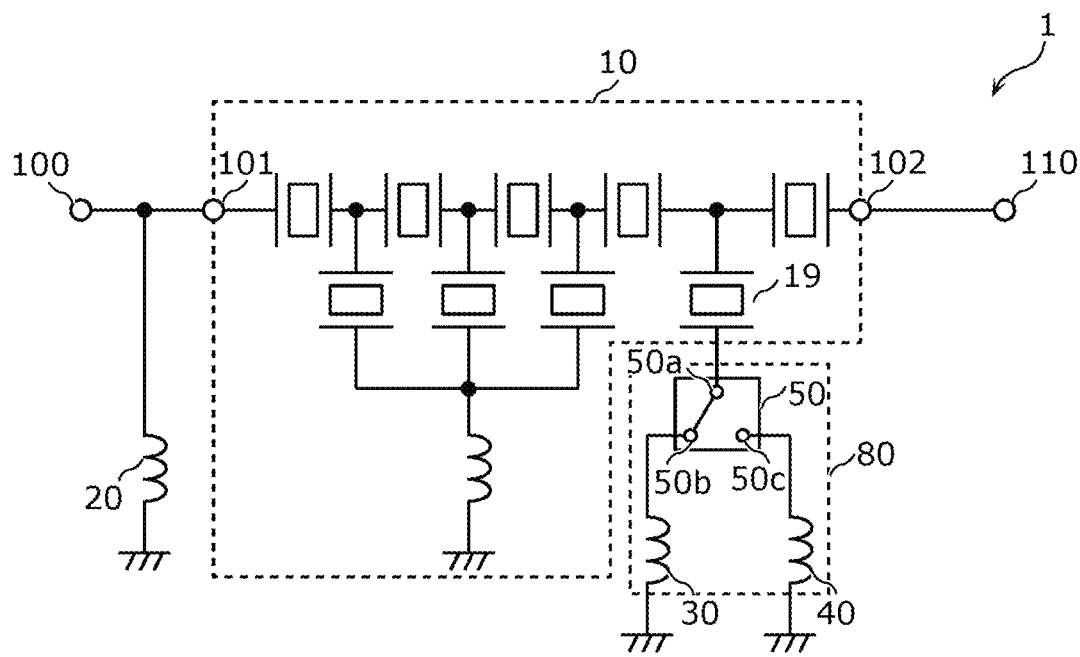
FIG. 3A is a diagram illustrating a first circuit state of a radio frequency module (without magnetic field coupling) according to an embodiment.
Figure 3B:
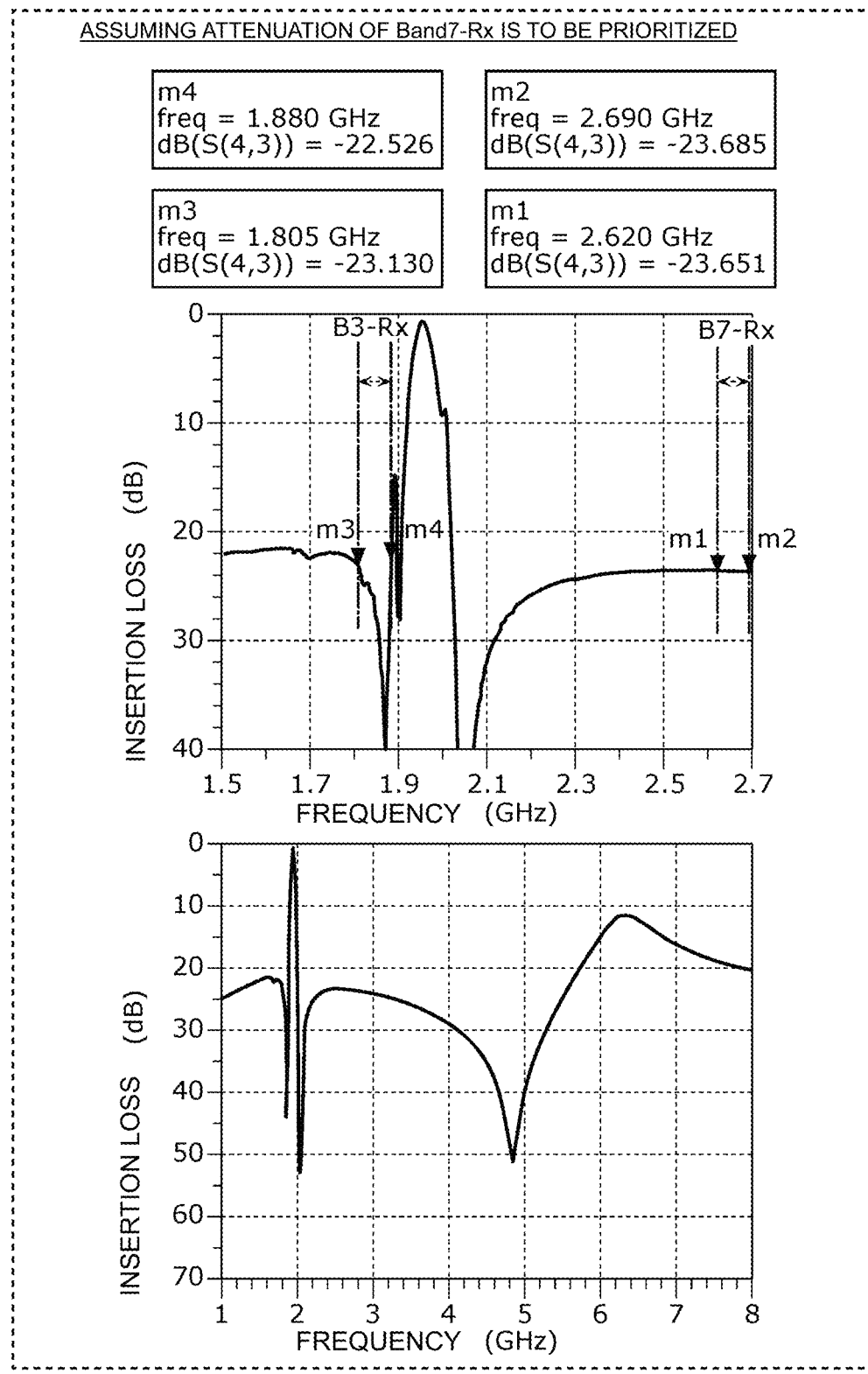
FIG. 3B includes graphs of bandpass characteristics in the first circuit state of a radio frequency module (without magnetic field coupling) according to an embodiment.

FIG. 3A is a diagram illustrating a first circuit state (first operation mode) of the radio frequency module 1 (without magnetic field coupling between the inductor 20 and the inductors 30 and 40) according to the embodiment. FIG. 3B includes graphs of the bandpass characteristics in the first circuit state (first operation mode) of the radio frequency module 1 (without magnetic field coupling) according to the embodiment.

As illustrated in FIG. 3A, in the first operation mode of the radio frequency module 1, assuming the attenuation in the downlink operation band (2620 MHz-2690 MHz) of Band 7 is to be prioritized, the common terminal 50a is connected to the selection terminal 50b, and the common terminal 50a is disconnected from the selection terminal 50c. FIG. 3B illustrates the bandpass characteristics in a narrow band (1.5 GHz-2.7 GHz) and in a wide band (1 GHz-8 GHz) of the filter 10.

Figure 4A:
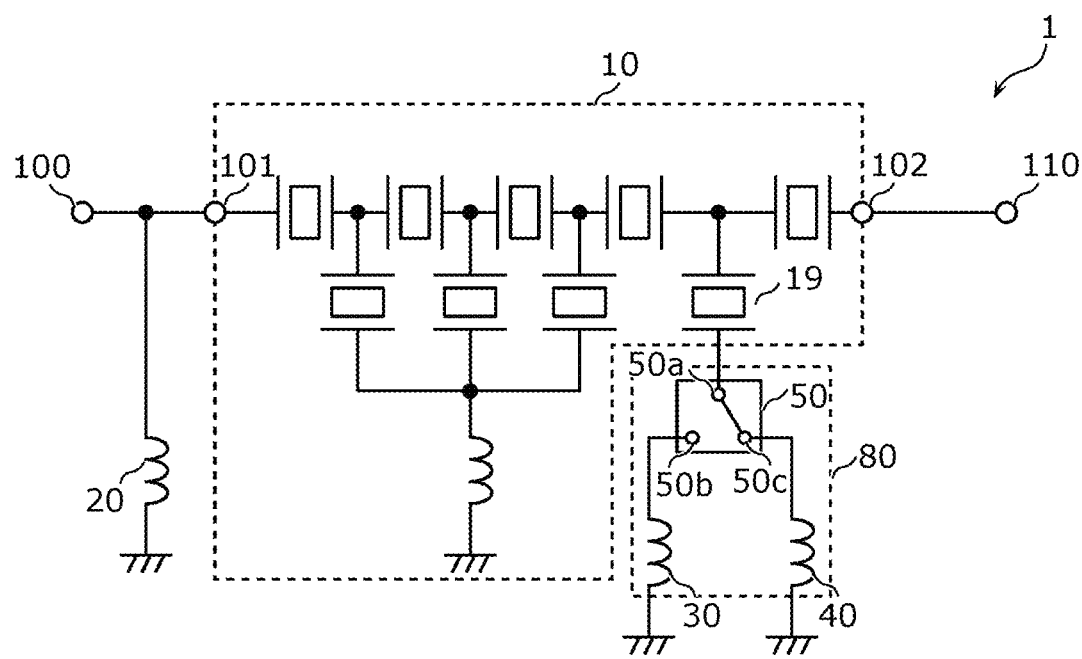
FIG. 4A is a diagram illustrating a second circuit state of a radio frequency module (without magnetic field coupling) according to an embodiment.
Figure 4B:
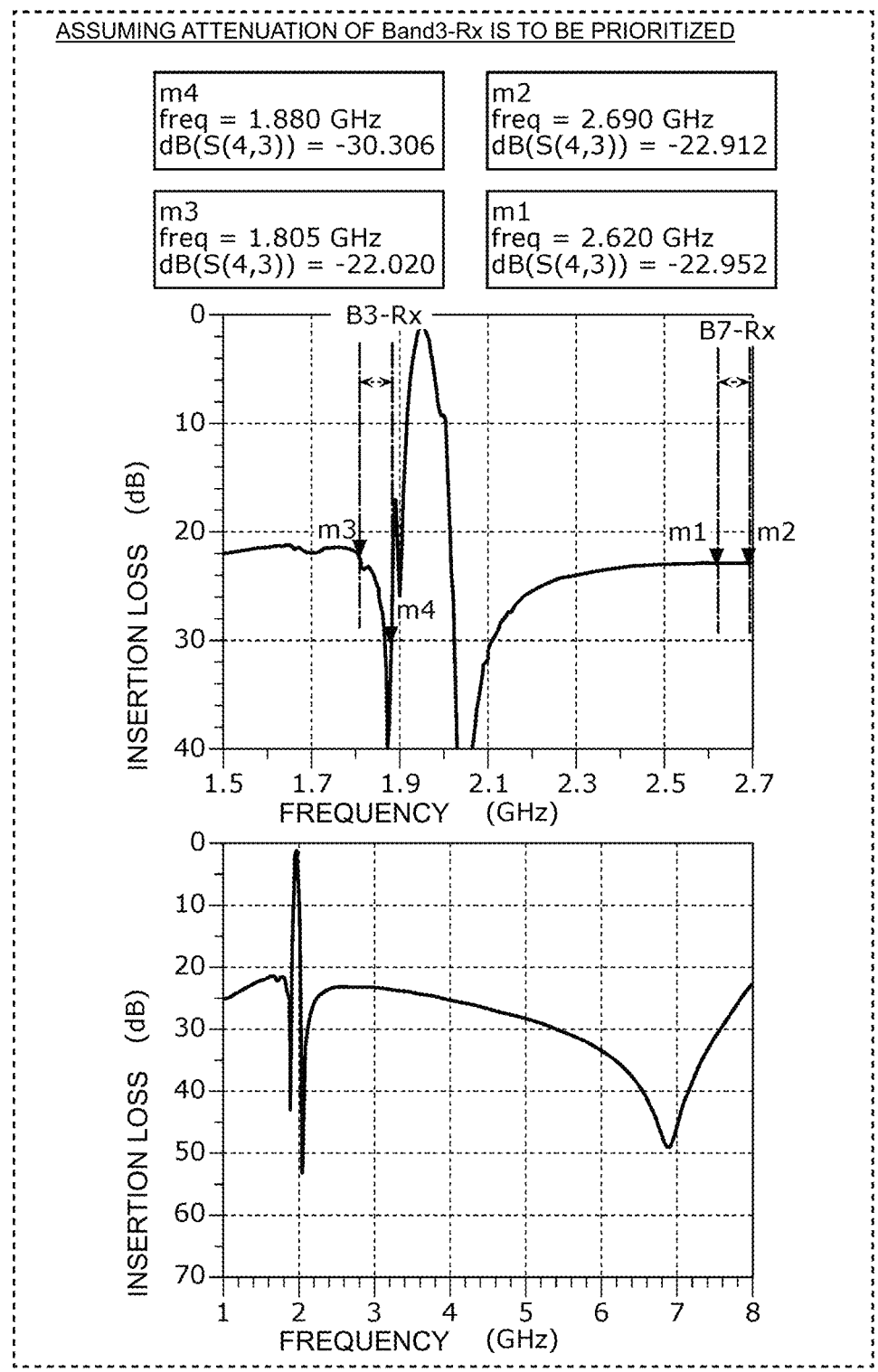
FIG. 4B includes graphs of bandpass characteristics in the second circuit state of a radio frequency module (without magnetic field coupling) according to an embodiment.

FIG. 4A is a diagram illustrating a second circuit state (second operation mode) of the radio frequency module 1 (without magnetic field coupling between the inductor 20 and the inductors 30 and 40) according to the embodiment. FIG. 4B includes graphs of the bandpass characteristics in the second circuit state (second operation mode) of the radio frequency module 1 (without magnetic field coupling) according to the embodiment.

As illustrated in FIG. 4A, in the second operation mode of the radio frequency module 1, assuming the attenuation in the downlink operation band (1805 MHz-1880 MHz) of Band 3 is to be prioritized, the common terminal 50a is connected to the selection terminal 50c, and the common terminal 50a is disconnected from the selection terminal 50b. FIG. 4B illustrates the bandpass characteristics in a narrow band (1.5 GHz-2.7 GHz) and in a wide band (1 GHz-8 GHz) of the filter 10.

Assuming the graph in FIG. 3B is compared with that in FIG. 4B, FIG. 3B shows an improved attenuation in the downlink operation band (between markers m1 and m2 in FIG. 3B) of Band 7 compared with FIG. 4B. In contrast, FIG. 4B shows an improved attenuation in the downlink operation band (at marker m4 in FIG. 4B) of Band 3 compared with FIG. 3B.

According to the configurations (without magnetic field coupling) of the radio frequency module 1, the inductor 30 is added between the ground and the first parallel arm resonator of the filter 10. Thus, in the first operation mode, the attenuation in the downlink operation band of Band 7 may be improved without an increase of the transmission loss in the passband of the filter 10. In addition, the inductor 40 is added between the ground and the first parallel arm resonator of the filter 10. Thus, in the second operation mode, the attenuation in the downlink operation band of Band 3 may be improved without an increase of the transmission loss in the passband of the filter 10. That is, switching of connection of the inductors 30 and 40 depending on the change of the operation mode of the radio frequency module 1 enables either one or both of the attenuation band and the attenuation to be changed while the good bandpass characteristics of the filter 10 are maintained.

Therefore, the radio frequency module 1 including an acoustic-wave filter having variable attenuation characteristics may be provided.

Figure 5A:
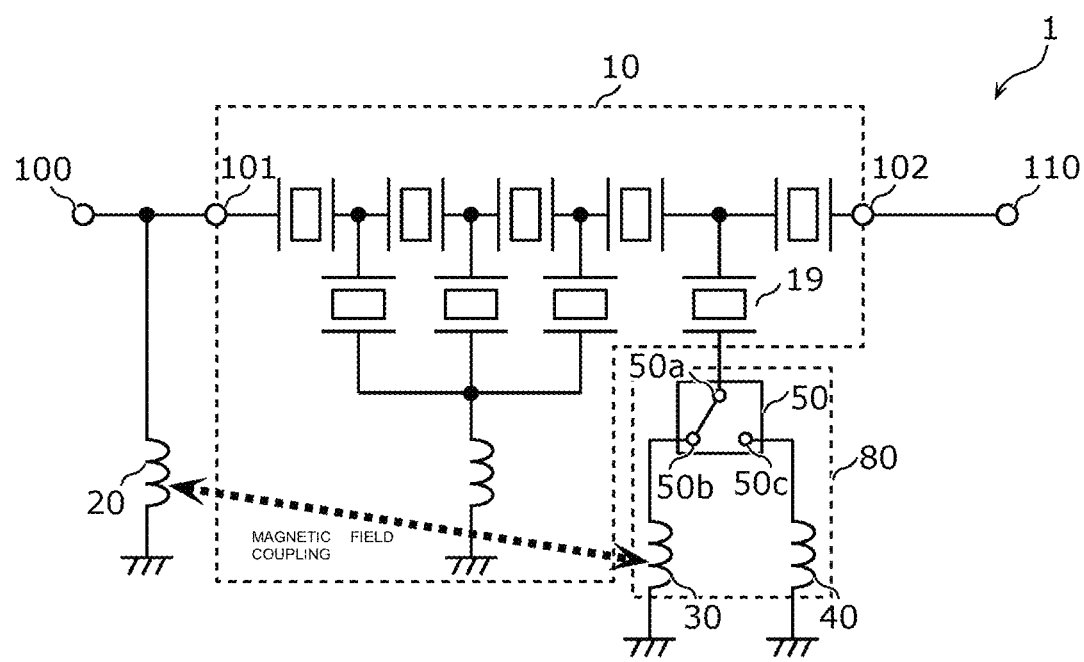
FIG. 5A is a diagram illustrating the first circuit state of a radio frequency module (with magnetic field coupling) according an embodiment.
Figure 5B:
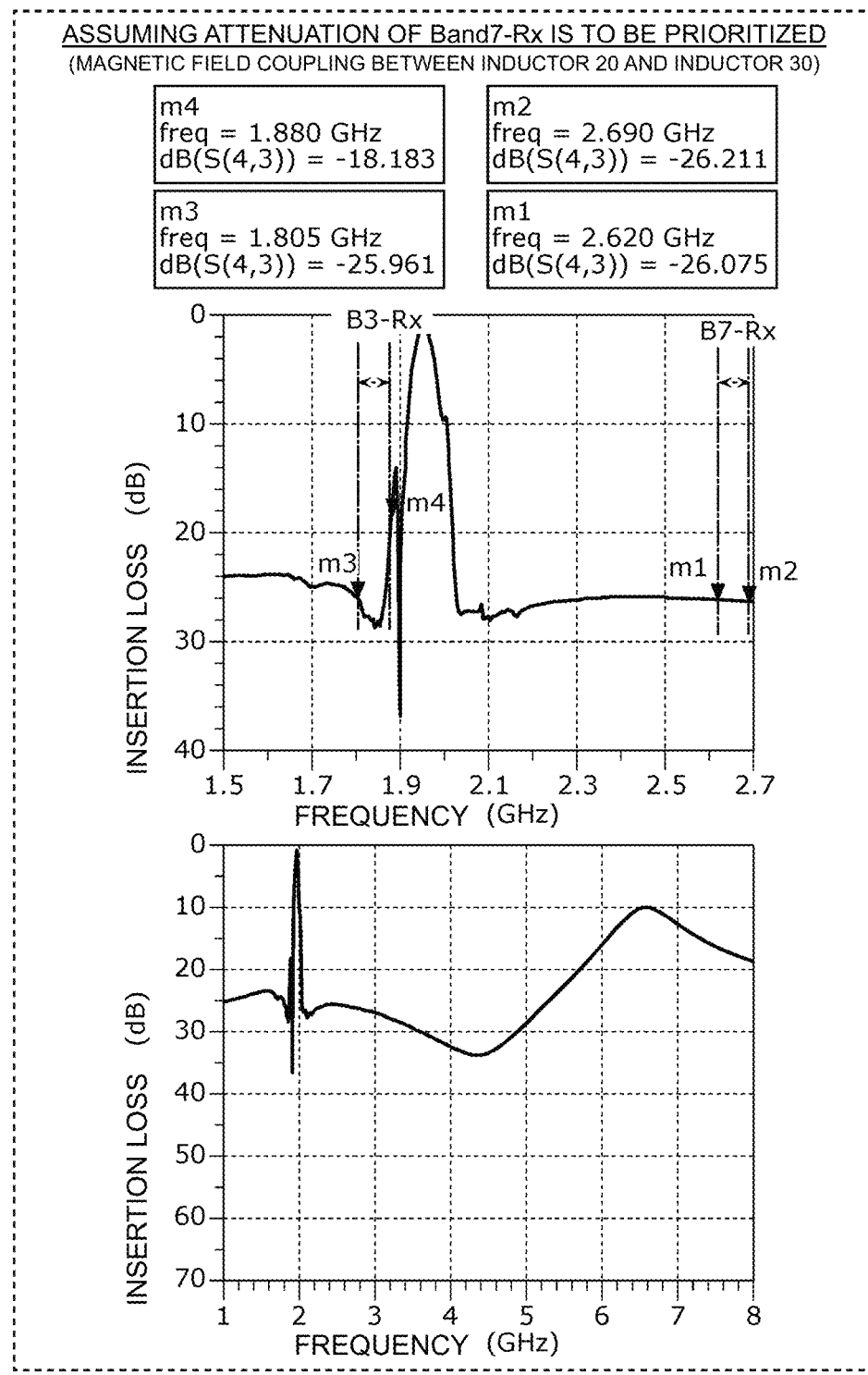
FIG. 5B includes graphs of bandpass characteristics in the first circuit state of a radio frequency module (with magnetic field coupling) according to an embodiment.

FIG. 5A is a diagram illustrating the first circuit state (first operation mode) of the radio frequency module 1 (with magnetic field coupling between the inductor 20 and the inductor 30 or 40) according to the embodiment. FIG. 5B includes graphs of the bandpass characteristics in the first circuit state (first operation mode) of the radio frequency module 1 (with magnetic field coupling) according to the embodiment.

As illustrated in FIG. 5A, in the first operation mode of the radio frequency module 1, assuming the attenuation in the downlink operation band (2620 MHz-2690 MHz) of Band 7 is to be prioritized, the common terminal 50a is connected to the selection terminal 50b, and the common terminal 50a is disconnected from the selection terminal 50c. FIG. 5B illustrates the bandpass characteristics in a narrow band (1.5 GHz-2.7 GHz) and in a wide band (1 GHz-8 GHz) of the filter 10.

Figure 6A:
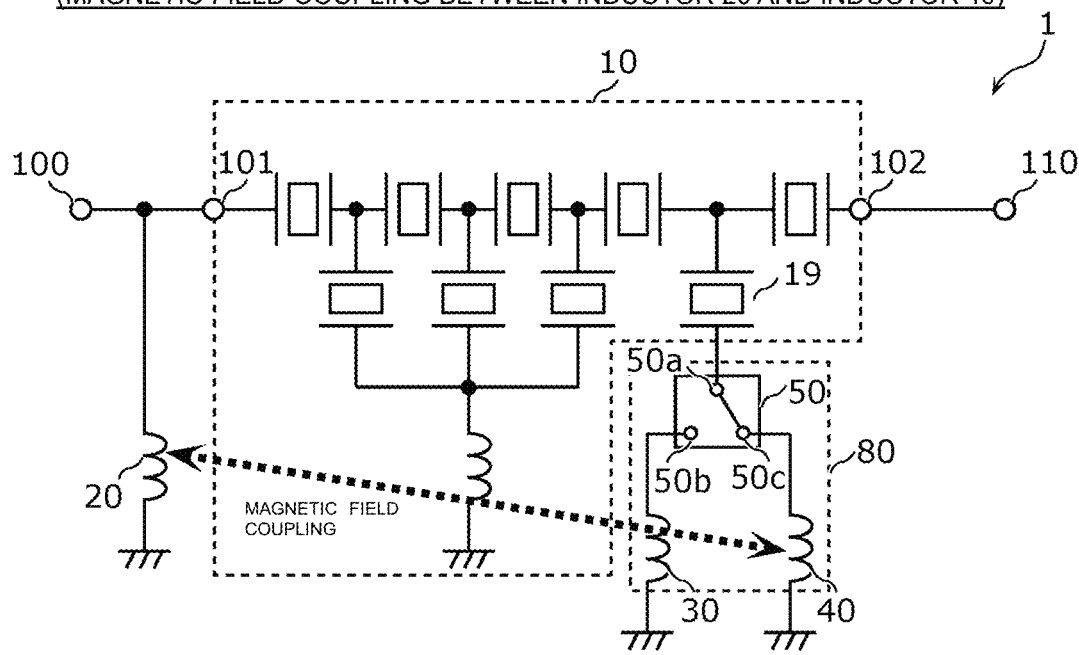
FIG. 6A is a diagram illustrating the second circuit state of a radio frequency module (with magnetic field coupling) according to an embodiment.
Figure 6B:
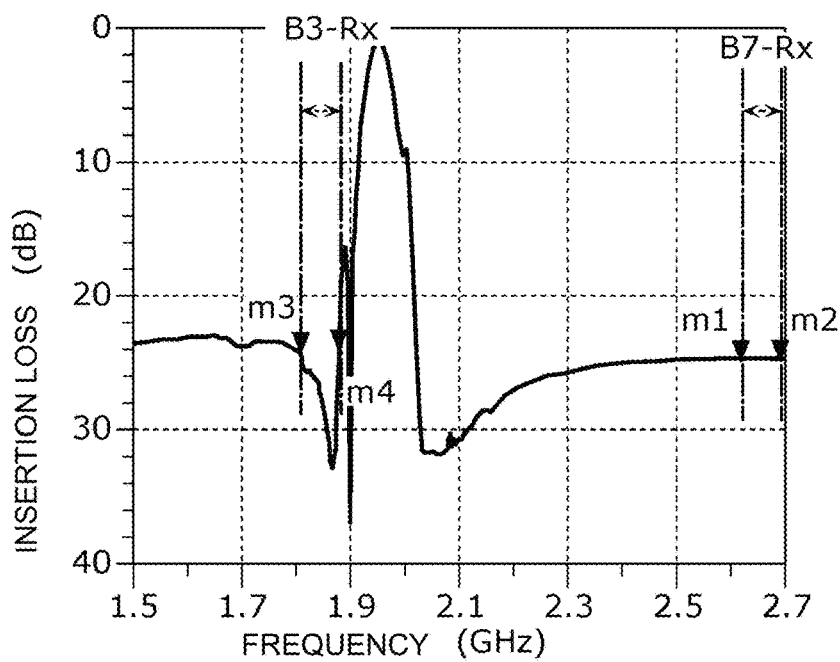
FIG. 6B includes graphs of bandpass characteristics in the second circuit state of a radio frequency module (with magnetic field coupling) according to an embodiment.
Figure 6B:
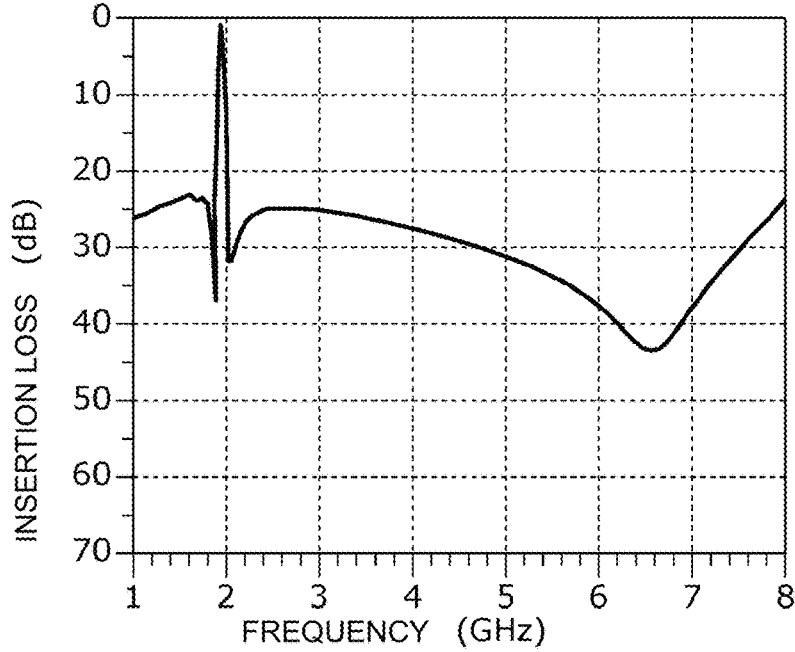

FIG. 6A is a diagram illustrating the second circuit state (second operation mode) of the radio frequency module 1 (with magnetic field coupling between the inductor 20 and the inductor 30 or 40) according to the embodiment. FIG. 6B includes graphs of the bandpass characteristics in the second circuit state (second operation mode) of the radio frequency module 1 (with magnetic field coupling) according to the embodiment.

As illustrated in FIG. 6A, in the second operation mode of the radio frequency module 1, assuming the attenuation in the downlink operation band (1805 MHz-1880 MHz) of Band 3 is to be prioritized, the common terminal 50a is connected to the selection terminal 50c, and the common terminal 50a is disconnected from the selection terminal 50b. FIG. 6B illustrates the bandpass characteristics in a narrow band (1.5 GHz-2.7 GHz) and in a wide band (1 GHz-8 GHz) of the filter 10.

Assuming the graph in FIG. 5B is compared with that in FIG. 6B, FIG. 5B shows an improved attenuation in the downlink operation band (between markers m1 and m2 in FIG. 5B) of Band 7 compared with FIG. 6B. In contrast, FIG. 6B shows an improved attenuation in the downlink operation band (between markers m3 and m4 in FIG. 6B) of Band 3 compared with FIG. 5B.

Further, in the radio frequency module 1 according to the embodiment, compared with the case in which no magnetic field coupling occurs between the inductor 20 and the inductors 30 and 40 (FIG. 3A and FIG. 4A), the case in which magnetic field coupling occurs between the inductor 20 and the inductor 30 or 40 (FIG. 5A and FIG. 6A) has improved attenuations in the downlink operation band of Band 7 and in the downlink operation band of Band 3.

According to the configurations (with magnetic field coupling) of the radio frequency module 1, in the first operation mode, the inductor 30 is added between the ground and the first parallel arm resonator of the filter 10. Thus, the attenuation in the downlink operation band of Band 7 may be improved without an increase of the transmission loss in the passband of the filter 10. In this case, the inductor 30 produces magnetic field coupling with the inductor 20. Thus, high frequency components through the inductors 30 and 20 may be made opposite in phase to radio frequency signals, which are transmitted from the terminal 102 to the terminal 101, in the downlink operation band (first attenuation band) of Band 7. Thus, the attenuation, in the downlink operation band of Band 7, of radio frequency signals transmitted from the terminal 102 to the terminal 101 may be made large.

In addition, the inductor 40 is added between the ground and the first parallel arm resonator of the filter 10. Thus, in the second operation mode, the attenuation in the downlink operation band of Band 3 may be improved without an increase of the transmission loss in the passband of the filter 10. In this case, the inductor 40 produces magnetic field coupling with the inductor 20. Thus, high frequency components through the inductors 40 and 20 may be made opposite in phase to radio frequency signals, which are transmitted from the terminal 102 to the terminal 101, in the downlink operation band (second attenuation band) of Band 3. Thus, the attenuation, in the downlink operation band of Band 3, of radio frequency signals transmitted from the terminal 102 to the terminal 101 may be made large.

That is, in the radio frequency module 1, assuming the common terminal 50a is connected to the selection terminal 50b, magnetic field coupling may occur between the inductors 20 and 30 so that high frequency components through the inductors 20 and 30 are opposite in phase to radio frequency signals, which are transmitted through the filter 10, in the first attenuation band. Assuming the common terminal 50a is connected to the selection terminal 50c, magnetic field coupling may occur between the inductors 20 and 40 so that high frequency components through the inductors 20 and 40 are opposite in phase to radio frequency signals, which are transmitted through the filter 10, in the second attenuation band.

According to this, switching of connection of the inductors 30 and 40 depending on change of the operation mode of the radio frequency module 1 enables either one or both of the attenuation band and the attenuation to be changed while the good bandpass characteristics and the good attenuation characteristics of the filter 10 are achieved. Therefore, the radio frequency module 1 including an acoustic-wave filter having variable attenuation characteristics may be provided.

3. The Configurations of Radio Frequency Modules according to Embodiment Example and Modified Examples The layout configuration of a radio frequency module according to an embodiment example will be described.

Figure 7:
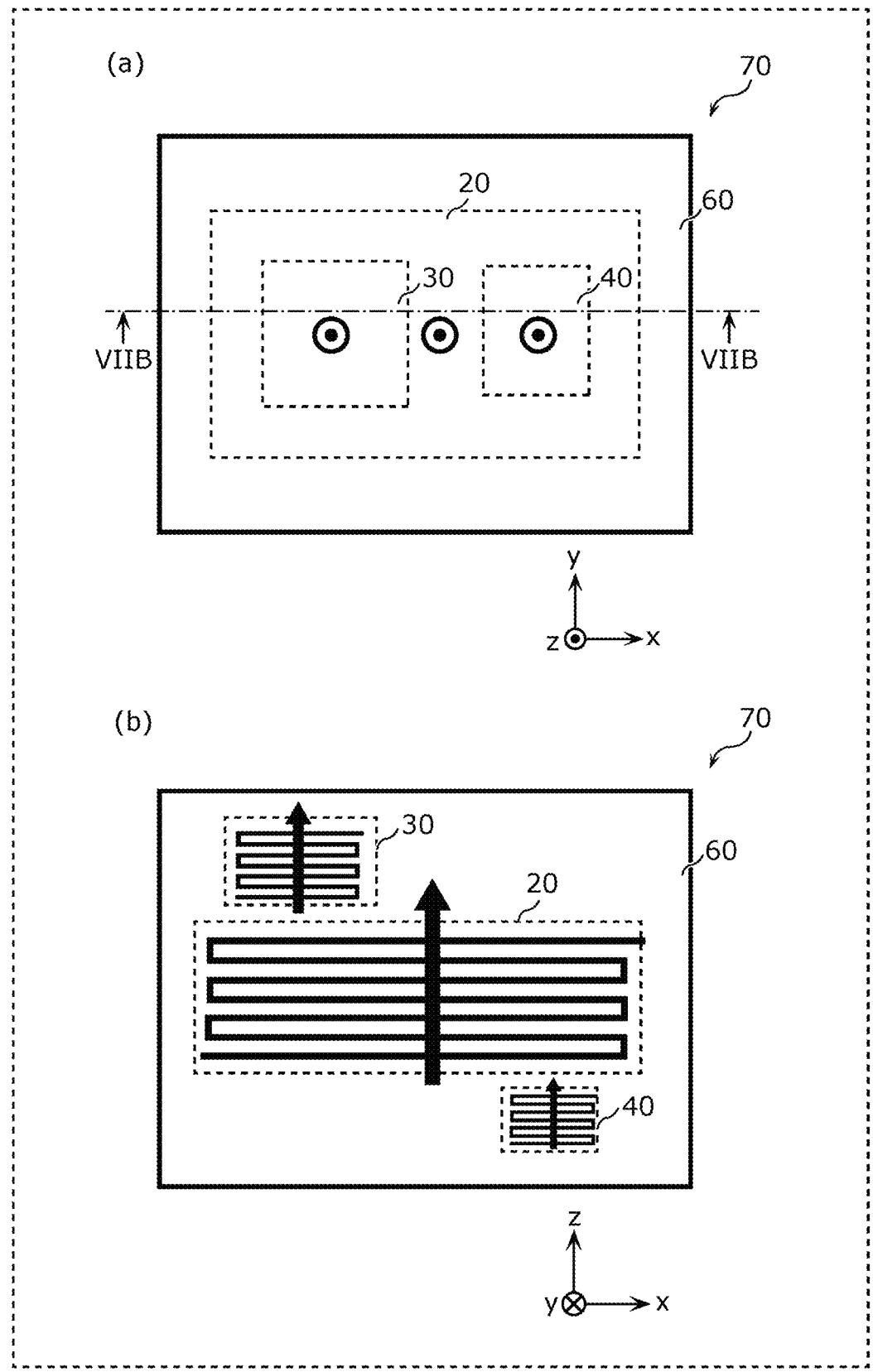
FIG. 7 includes a schematic plan view and a schematic cross-sectional view of a semiconductor integrated circuit (IC) according to a first embodiment example.

FIG. 7 includes a schematic plan view and a schematic cross-sectional view of a semiconductor IC 70 according to a first embodiment example. FIG. 7(a) is a schematic plan view of the semiconductor IC 70 including the inductors 20, 30, and 40. FIG. 7(b) is a schematic cross-sectional view of the semiconductor IC 70 including the inductors 20, 30, and 40.

As illustrated in FIGS. 7(a) and 7(b), in the first embodiment example, the inductors 20, 30, and 40 are formed in the single semiconductor integrated circuit (IC) 70.

The inductors 20, 30, and 40 are formed in a semiconductor substrate 60, and are formed, for example, of coil conductors having a winding structure.

The semiconductor IC 70, which is an exemplary first integrated circuit, may be formed, for example, by using complementary metal oxide semiconductor (CMOS), and may be specifically manufactured through a Silicon on Insulator (SOI) process. The semiconductor IC 70 is not limited to CMOS.

According to this, the inductors 20, 30, and 40 are formed in the same chip. Thus, the layout relationship between the inductors 20, 30, and 40 may be stabilized without influence of the forming accuracy (such as inclination due to the mounting accuracy or the like) of a radio frequency module in which the inductors 20, 30, and 40 are formed. In addition, the degrees of magnetic field coupling between the inductor 20 and the inductors 30 and 40 may be stabilized.

As illustrated in FIG. 7(*b*), the winding axis of the inductor 20, that of the inductor 30, and that of the inductor 40 are parallel to each other. The inductors 20, 30, and 40 are disposed in the direction of the winding axis of the inductor 20 (z-axis direction) in the order of the inductor 30, the inductor 20, and the inductor 40. Assuming the semiconductor IC 70 is viewed in the direction of the winding axis of the inductor 20, the inductor 20 at least partially overlaps the inductor 30, and the inductor 20 at least partially overlaps the inductor 40. In other words, the inductor 20 is disposed near the center of the semiconductor IC 70, and is sandwiched by the inductors 30 and 40 in the direction of the winding axis (z-axis direction).

According to this, the directions of the winding axes of the inductors 20, 30, and 40 are the same; the inductor 20 is disposed adjacent to the inductor 30; the inductor 20 is disposed adjacent to the inductor 40. Thus, the semiconductor IC 70 may be reduced in size while large mutual inductances are achieved. In addition, the inductors 30 and 40 are disposed on the different sides of the inductor 20, ensuring large areas in which the inductors 30 and 40 are respectively formed.

The winding axis of an inductor is defined as follows. Assuming an inductor is formed by using a planar coil, the winding axis is an axis which is perpendicular to a plane including the planar coil and which crosses an area surrounded by the planar coil. Assuming an inductor is a chip component, the winding axis is the winding axis of a coil formed in the component.

As illustrated in FIG. 7(*a*), assuming viewed in the direction of the winding axis of the inductor 20, the inductor 30 does not overlap the inductor 40.

According to this, unnecessary magnetic field coupling between the inductor 30 and the inductor 40 may be suppressed.

The inductance value of the inductor 20 may be greater than that of the inductor 30, and may be greater than that of the inductor 40. To achieve this, the winding diameter of the inductor 20 may be larger than that of the inductor 30, and may be larger than that of the inductor 40.

Figure 8A:
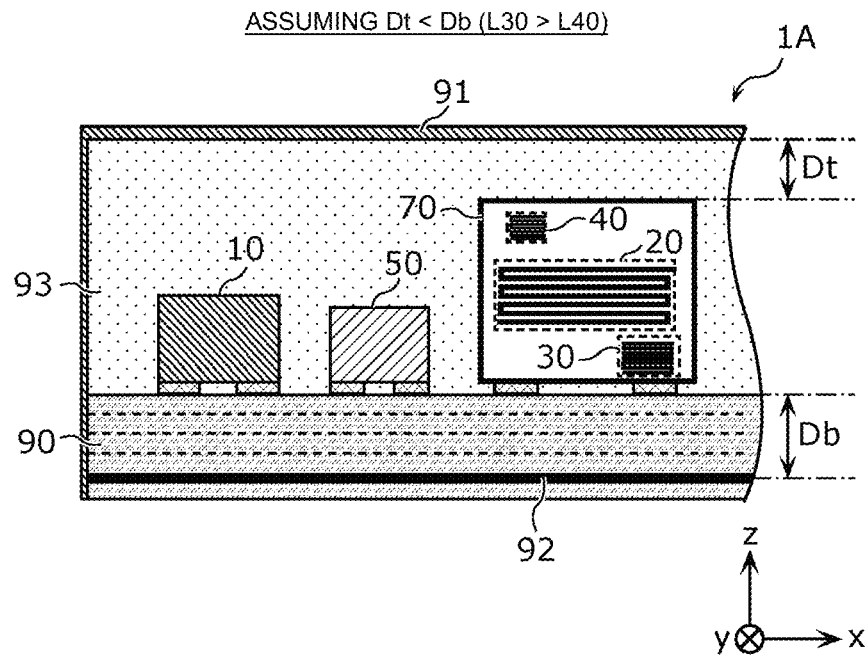
FIG. 8A is a cross-sectional view of a radio frequency module according to the first embodiment example.

FIG. 8A is a cross-sectional view of a radio frequency module 1A according to the first embodiment example. FIG. 8A illustrates the semiconductor IC 70, the filter 10, and the switch 50 among the circuit components included in the radio frequency module 1A according to the embodiment example. The radio frequency module 1A further includes a module substrate 90, a shield electrode layer 91, a ground layer 92, and a resin member 93 in addition to the circuit components illustrated in FIG. 1.

The module substrate 90 is a substrate on which circuit components included in the radio frequency module 1A are mounted. For example, the module substrate 90 is a low temperature co-fired ceramics (LTCC) substrate, a high temperature co-fired ceramics (HTCC) substrate, a component-embedded substrate, a substrate having a redistribution layer (RDL), or a printed circuit board which has a layered structure of multiple dielectric layers.

The semiconductor IC 70, the filter 10, and the switch 50 are disposed on a principal surface of the module substrate 90.

The resin member 93 is disposed so as to cover the principal surface of the module substrate 90, the filter 10, the switch 50, and the semiconductor IC 70.

The shield electrode layer 91, which is an exemplary ground electrode layer, is formed so as to cover the surfaces of the resin member 93 and the sides of the module substrate 90, and is set to the ground potential.

The ground layer 92, which is an exemplary ground electrode layer, is formed in the module substrate 90, and is set to the ground potential.

The inductance value L30 of the inductor 30 is greater than the inductance value L40 of the inductor 40. The distance Db between the inductor 30 and the ground electrode layer (ground layer 92) which is disposed closest to the inductor 30 is larger than the distance Dt between the inductor 40 and the ground electrode layer (shield electrode layer 91) which is disposed closest to the inductor 40.

According to this, the surface, on which the inductor 30 whose inductance value is greater among the inductors 30 and 40 is disposed, is far from the ground electrode layers of the radio frequency module 1A, achieving suppression of degradation of the Q value of the inductor 30 due to the ground electrode layers.

Figure 8B:
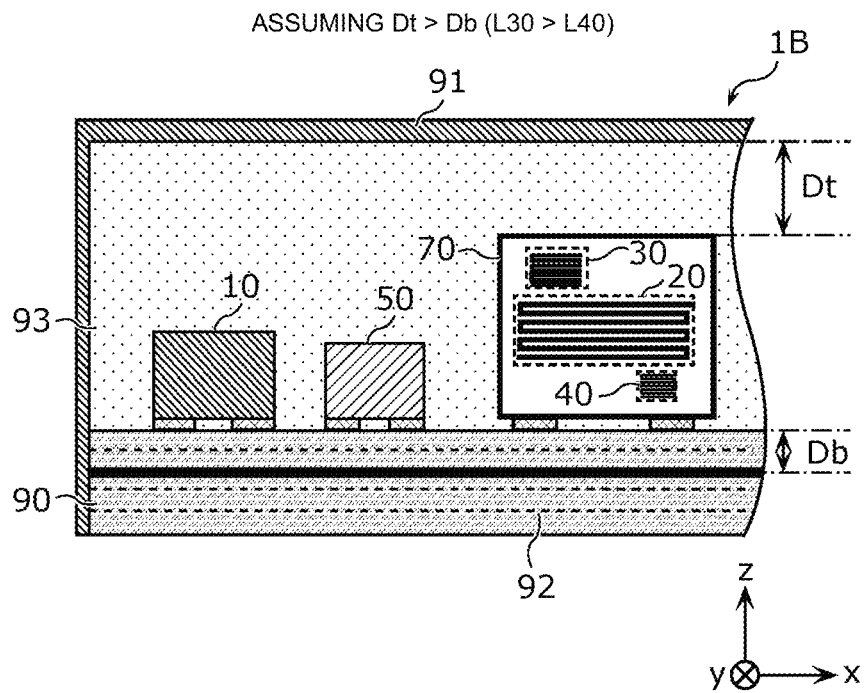
FIG. 8B is a cross-sectional view of a radio frequency module according to a first modified example.

FIG. 8B is a cross-sectional view of a radio frequency module 1B according to a first modified example. FIG. 8B illustrates the semiconductor IC 70, the filter 10, and the switch 50 among the circuit components included in the radio frequency module 1B according to the first modified example. The radio frequency module 1B further includes the module substrate 90, the shield electrode layer 91, the ground layer 92, and the resin member 93 in addition to the circuit components illustrated in FIG. 1. The radio frequency module 1B according to the first modified example is different from the radio frequency module 1A according to the embodiment example in the mounting configuration of the semiconductor IC 70. The radio frequency module 1B according to the present modified example will be described by focusing on the configuration different from that of the radio frequency module 1A according to the embodiment example.

The inductance value L30 of the inductor 30 is greater than the inductance value L40 of the inductor 40. The distance Dt between the inductor 30 and the ground electrode layer (shield electrode layer 91) disposed closest to the inductor 30 is larger than the distance Db between the inductor 40 and the ground electrode layer (ground layer 92) disposed closest to the inductor 40. That is, in the semiconductor IC 70 according to the present modified example, the inductors 30 and 40 are disposed inversely in the z-axis direction compared with the semiconductor IC 70 according to the embodiment example, in consideration of the distances between the inductors 30 and 40 and the ground electrode layers.

According to this, the surface, on which the inductor 30 whose inductance value is greater among the inductors 30 and 40 is disposed, is far from the ground electrode layers of the radio frequency module 1B, achieving suppression of degradation of the Q value of the inductor 30 due to the ground electrode layers.

Mounting configurations in which the inductors 20, 30, and 40 are individual circuit components will be described.

Figure 9A:
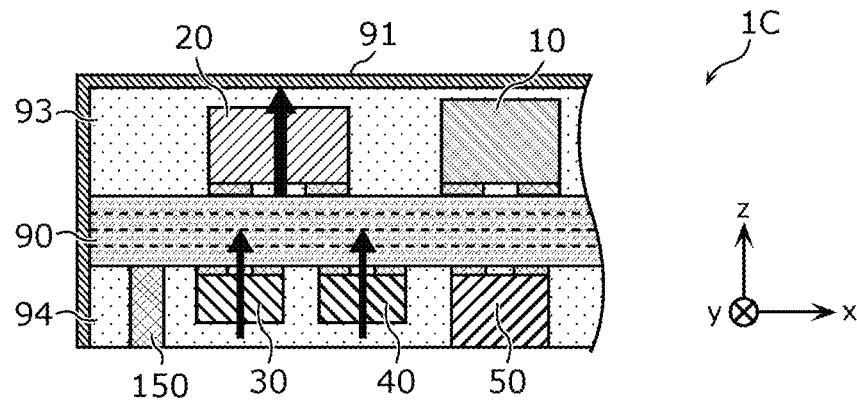
FIG. 9A is a cross-sectional view of a radio frequency module according to a second modified example.

FIG. 9A is a cross-sectional view of a radio frequency module 1C according to a second modified example. FIG. 9A illustrates the inductors 20, 30, and 40, the filter 10, and the switch 50 among the circuit components included in the radio frequency module 1C according to the modified example. The radio frequency module 1C further includes the module substrate 90, the shield electrode layer 91, an external connection terminal 150, and resin members 93 and 94 in addition to the circuit components illustrated in FIG. 1.

The module substrate 90 is a substrate which has a first principal surface and a second principal surface which are opposite each other and on which circuit components included in the radio frequency module 1C are mounted. For example, the module substrate 90 is an LTCC substrate, an HTCC substrate, a component-embedded substrate, a substrate having an RDL, or a printed circuit board which has a layered structure of multiple dielectric layers.

The resin member 93 is disposed so as to cover the first principal surface of the module substrate 90, the filter 10, and the inductor 20. The resin member 94 is disposed so as to cover the second principal surface of the module substrate 90, the inductors 30 and 40, and the switch 50.

The shield electrode layer 91, which is an exemplary ground electrode layer, is formed so as to cover the surfaces of the resin members 93 and 94 and the sides of the module substrate 90, and is set to the ground potential.

The external connection terminal 150 is disposed on the second principal surface of the module substrate 90, and is connected to an electrode on a mother board disposed on the second principal surface side of the radio frequency module 1C.

The inductors 20, 30, and 40 are, for example, surface mount chip components including coil conductors having a winding structure. The winding axis of the inductor 20, that of the inductor 30, and that of the inductor 40 are parallel to each other. The inductor 20 is disposed on the first principal surface. The inductors 30 and 40 are disposed on the second principal surface.

Assuming the radio frequency module 1C is viewed in the direction of the winding axis of the inductor 20 (z-axis direction), the inductor 20 at least partially overlaps the inductor 30, and the inductor 20 at least partially overlaps the inductor 40.

According to this, the directions of the winding axes of the inductors 20, 30, and 40 are the same; the inductor 20 and the inductor 30, which sandwich the module substrate 90, overlap each other in the winding-axis direction; the inductor 20 and the inductor 40, which sandwich the module substrate 90, overlap each other in the winding-axis direction. Thus, the radio frequency module 1C may be reduced in size while large mutual inductances are achieved.

In addition, the degree of magnetic field coupling between the inductors 30 and 20 is different from that between the inductors 40 and 20. This allows the attenuation characteristics of the radio frequency module 1C to be changed.

To make the degree of magnetic field coupling between the inductors 30 and 20 different from that between the inductors 40 and 20, the distance between the inductors 30 and 20 may be made different from that between the inductors 40 and 20.

In addition, to make the degree of magnetic field coupling between the inductors 30 and 20 different from that between the inductors 40 and 20, the inductance value L30 of the inductor 30 may be made different from the inductance value L40 of the inductor 40.

The switch 50 is disposed on the second principal surface. According to this, the inductor 20 is disposed on the first principal surface; the switch 50 is disposed on the second principal surface. Thus, the distance between the inductor 20 and the switch 50 may be made large, achieving suppression of unnecessary coupling between the inductor 20 and the switch 50 and enabling adjustment of the degrees of magnetic field coupling between the inductor 20 and the inductors 30 and 40 with high accuracy. In addition, a control signal for controlling switching of connection in the switch 50 is supplied from the mother board side disposed on the second principal surface side. Thus, the switch 50 is disposed on the second principal surface, achieving short control wiring and enabling control of switching of connection in the switch 50 with high accuracy.

The filter 10 may be formed in a second integrated circuit including a piezoelectric substrate. In this case, the switch 50 is disposed outside the second integrated circuit. This achieves a reduction in size of the filter 10.

Figure 9B:
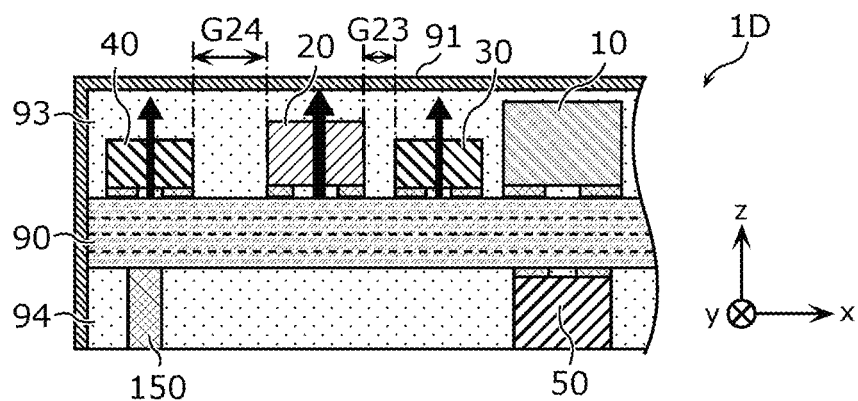
FIG. 9B is a cross-sectional view of a radio frequency module according to a third modified example.

FIG. 9B is a cross-sectional view of a radio frequency module 1D according to a third modified example. FIG. 9B illustrates the inductors 20, 30, and 40, the filter 10, and the switch 50 among the circuit components included in the radio frequency module 1D according to the third modified example. The radio frequency module 1D further includes the module substrate 90, the shield electrode layer 91, the external connection terminal 150, and the resin members 93 and 94 in addition to the circuit components illustrated in FIG. 1. The radio frequency module 1D according to the present modified example is different from the radio frequency module 1C according to the second modified example in the mounting configuration of the inductors 20, 30, and 40. The radio frequency module 1D according to the present modified example will be described below by focusing on the configuration different from that of the radio frequency module 1C according to the second modified example.

The inductors 20, 30, and 40 are, for example, surface mount chip components including coil conductors having a winding structure. The winding axis of the inductor 20, that of the inductor 30, and that of the inductor 40 are parallel to each other, and are perpendicular to the principal surfaces of the module substrate 90. The inductors 20, 30, and 40 are disposed on the first principal surface.

The inductor 30 is disposed adjacent to the inductor 20; the inductor 40 is disposed adjacent to the inductor 20.

According to this, the directions of the winding axes of the inductors 20, 30, and 40 are the same; the inductor 20 is disposed adjacent to the inductor 30; the inductor 20 is disposed adjacent to the inductor 40, achieving a reduction in size of the radio frequency module 1D while large mutual inductances are achieved.

In addition, the degree of magnetic field coupling between the inductors 30 and 20 is different from that between the inductors 40 and 20. This allows the attenuation characteristics of the radio frequency module 1D to be changed.

To make the degree of magnetic field coupling between the inductors 30 and 20 different from that between the inductors 40 and 20, the distance G23 between the inductors 30 and 20 may be made different from the distance G24 between the inductors 40 and 20.

To make the degree of magnetic field coupling between the inductors 30 and 20 different from that between the inductors 40 and 20, the inductance value L30 of the inductor 30 may be made different from the inductance value L40 of the inductor 40.

Figure 9C:
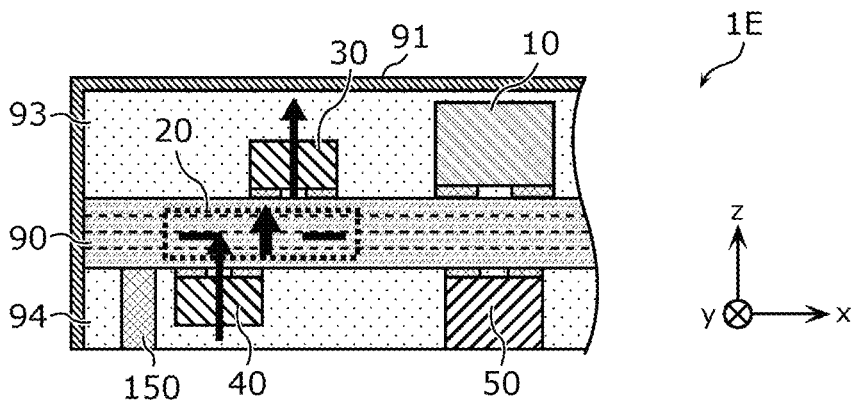
FIG. 9C is a cross-sectional view of a radio frequency module according to a fourth modified example.

FIG. 9C is a cross-sectional view of a radio frequency module 1E according to a fourth modified example. FIG. 9C illustrates the inductors 20, 30, and 40, the filter 10, and the switch 50 among the circuit components included in the radio frequency module 1E according to the fourth modified example. The radio frequency module 1E further includes the module substrate 90, the shield electrode layer 91, the external connection terminal 150, and the resin members 93 and 94 in addition to the circuit components illustrated in FIG. 1. The radio frequency module 1E according to the present modified example is different from the radio frequency module 1C according to the second modified example in the mounting configuration of the inductors 20, 30, and 40. The radio frequency module 1E according to the present modified example will be described below by focusing on the configuration different from that of the radio frequency module 1C according to the second modified example.

The inductor 20 is formed, for example, of a coil conductor having a winding structure, and is formed in the module substrate 90. The inductors 30 and 40 are, for example, surface mount chip components including coil conductors having a winding structure. The winding axis of the inductor 20, that of the inductor 30, and that of the inductor 40 are parallel to each other. The inductor 30 is disposed on the first principal surface. The inductor 40 is disposed on the second principal surface.

Assuming the radio frequency module 1E is viewed in the direction of the winding axis of the inductor 20 (z-axis direction), the inductor 20 at least partially overlaps the inductor 30, and the inductor 20 at least partially overlaps the inductor 40.

According to this, the directions of the winding axes of the inductors 20, 30, and 40 are the same; the inductor 20 overlaps the inductor 30 in the winding-axis direction; the inductor 20 overlaps the inductor 40 in the winding-axis direction, achieving a reduction in size of the radio frequency module 1E while large mutual inductances are achieved.

In addition, the degree of magnetic field coupling between the inductors 30 and 20 is different from that between the inductors 40 and 20. This allows the attenuation characteristics of the radio frequency module 1E to be changed.

To make the degree of magnetic field coupling between the inductors 30 and 20 different from that between the inductors 40 and 20, the distance between the inductors 30 and 20 may be made different from that between the inductors 40 and 20.

To make the degree of magnetic field coupling between the inductors 30 and 20 different from that between the inductors 40 and 20, the inductance value L30 of the inductor 30 may be made different from the inductance value L40 of the inductor 40.

Figure 9D:
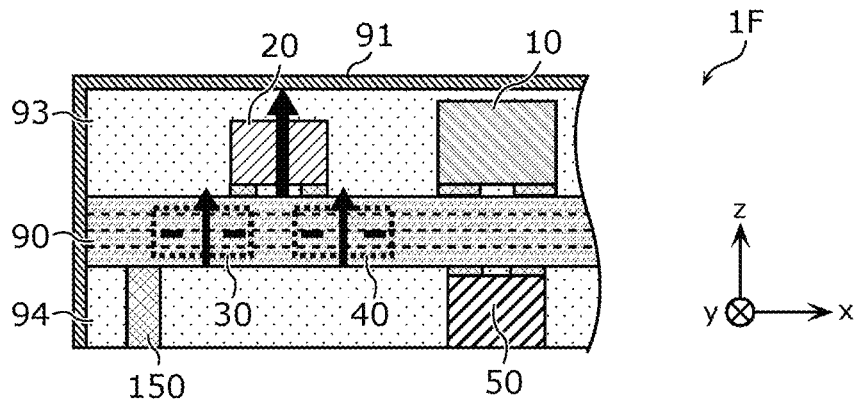
FIG. 9D is a cross-sectional view of a radio frequency module according to a fifth modified example.

FIG. 9D is a cross-sectional view of a radio frequency module 1F according to a fifth modified example. FIG. 9D illustrates the inductors 20, 30, and 40, the filter 10, and the switch 50 among the circuit components included in the radio frequency module 1F according to the fifth modified example. The radio frequency module 1F further includes the module substrate 90, the shield electrode layer 91, the external connection terminal 150, and the resin members 93 and 94 in addition to the circuit components illustrated in FIG. 1. The radio frequency module 1F according to the present modified example is different from the radio frequency module 1C according to the second modified example in the mounting configuration of the inductors 20, 30, and 40. The radio frequency module 1F according to the present modified example will be described below by focusing on the configuration different from that of the radio frequency module 1C according to the second modified example.

The inductors 30 and 40 are formed, for example, of coil conductors having a winding structure, and are formed in the module substrate 90. The inductor 20 is, for example, a surface mount chip component formed of a coil conductor having a winding structure. The winding axis of the inductor 20, that of the inductor 30, and that of the inductor 40 are parallel to each other, and the inductor 20 is disposed on the first principal surface.

Assuming the radio frequency module 1F is viewed in the direction of the winding axis of the inductor 20 (z-axis direction), the inductor 20 at least partially overlaps the inductor 30, and the inductor 20 at least partially overlaps the inductor 40.

According to this, the directions of the winding axes of the inductors 20, 30, and 40 are the same; the inductor 20 overlaps the inductor 30 in the winding-axis direction; the inductor 20 overlaps the inductor 40 in the winding-axis direction, achieving a reduction in size of the radio frequency module 1F while large mutual inductances are achieved.

In addition, the degree of magnetic field coupling between the inductors 30 and 20 is different from that between the inductors 40 and 20. This allows the attenuation characteristics of the radio frequency module 1F to be changed.

To make the degree of magnetic field coupling between the inductors 30 and 20 different from that between the inductors 40 and 20, the distance between the inductors 30 and 20 may be made different from that between the inductors 40 and 20.

To make the degree of magnetic field coupling between the inductors 30 and 20 different from that between the inductors 40 and 20, the inductance value L30 of the inductor 30 may be made different from the inductance value L40 of the inductor 40.

4. Effects and the Like

The radio frequency module 1 according to the present embodiment includes the input/output terminals 100 and 110, the filter 10, the inductor 20, and the parallel arm circuit 80. The filter 10 has plural serial arm resonators, which are serially disposed on the first path connecting the input/output terminals 100 and 110 to each other, and one or more parallel arm resonators, which are connected between the first path and the ground. The inductor 20 is connected to the second path connecting the input/output terminal 100 or 110 to the filter 10. The parallel arm circuit 80 is connected between the ground and the first parallel arm resonator among the one or more parallel arm resonators. The parallel arm circuit 80 includes the inductors 30 and 40 and the switch 50 having the common terminal 50a and the selection terminals 50b and 50c. The selection terminal 50b is connected to the first end of the inductor 30. The selection terminal 50c is connected to the first end of the inductor 40. The common terminal 50a is connected to either one of the first parallel arm resonator and the ground. The inductor 30 and the inductor 40 are connected, at their second ends, to the other one of the first parallel arm resonator and the ground.

According to this, the inductor 30 and/or the inductor 40 are added between the first parallel arm resonator and the ground. Thus, the attenuation in a specific attenuation band may be improved without an increase of the transmission loss in the passband of the filter 10. In this case, even assuming a filter which operates simultaneously with the filter 10 is changed, or even assuming the frequency, power, or the like of signals passing through the filter 10 is changed, the inductors 30 and 40 enable either one or both of the attenuation band and the attenuation to be changed while the low loss in the passband of the filter 10 is maintained.

Therefore, the radio frequency module 1 including an acoustic-wave filter having variable attenuation characteristics may be provided.

In addition, for example, in the radio frequency module 1, at least one of the inductors 30 and 40 is capable of producing magnetic field coupling with the inductor 20.

According to this, magnetic field coupling between the inductor 30 and the inductor 20 allows high frequency components through the inductors 30 and 20 to be made opposite in phase to radio frequency signals, which are transmitted through the filter 10, in the first attenuation band. This enables the attenuation, in the first attenuation band, of radio frequency signals, which are transmitted through the filter 10, to be made large. In addition, magnetic field coupling between the inductor 40 and the inductor 20 allows high frequency components through the inductors 40 and 20 to be made opposite in phase to radio frequency signals, which are transmitted through the filter 10, in the second attenuation band. This enables the attenuation, in the second attenuation band, of radio frequency signals, which are transmitted through the filter 10, to be made large. That is, even assuming a filter which operates simultaneously with the filter 10 is changed, or even assuming the frequency, power, or the like of signals passing through the filter 10 is changed, the inductors 30 and 40 enable either one or both of the attenuation band and the attenuation to be changed while the good bandpass characteristics and the good attenuation characteristics of the filter 10 are maintained. Therefore, the radio frequency module 1 including an acoustic-wave filter having variable attenuation characteristics may be provided. Further, magnetic field coupling between the inductor 20 and at least one of the inductors 30 and 40 may add mutual inductance, which is generated by the magnetic field coupling with the inductor 20, to the inductance value of the inductor 30 and/or the inductance value of the inductor 40, which are necessary to improve the attenuation characteristics of the filter 10, achieving a reduction of the inductance value of the inductor 30 itself and/or a reduction of the inductance value of the inductor 40 itself. This achieves reductions in size of the inductors 30 and 40 and a reduction in size of the radio frequency module 1.

In addition, for example, in the radio frequency module 1, the inductor 20 is connected between the second path and the ground.

In addition, for example, in the radio frequency module 1, the inductance value of the inductor 20 is greater than that of the inductor 30, and is greater than that of the inductor 40.

In addition, for example, in the radio frequency module 1, the switch 50 switches between connection and disconnection between the common terminal 50a and the selection terminal 50b, and switches between connection and disconnection between the common terminal 50a and the selection terminal 50c.

According to this, the radio frequency module 1 achieves (1) connection between the filter 10 and the inductor 30 and disconnection between the filter 10 and the inductor 40, (2) disconnection between the filter 10 and the inductor 30 and connection between the filter 10 and the inductor 40, (3) connection between the filter 10 and the inductor 30 and connection between the filter 10 and the inductor 40, and (4) disconnection between the filter 10 and the inductor 30 and disconnection between the filter 10 and the inductor 40.

In addition, for example, in the radio frequency module 1, the inductor 20 is connected to the input/output terminal 100. The parallel arm resonator 19 connected to the parallel arm circuit 80 is connected to the first path at the farthest distance from the input/output terminal 100 among the parallel arm resonators 16 to 19.

According to this, the signal strength of high frequency components received by the parallel arm circuit 80 is great, enabling signals in a predetermined attenuation band, which are transmitted through the filter 10, to be cancelled sufficiently.

In addition, for example, in the radio frequency module 1, the parallel arm circuit 80 is connected only to the parallel arm resonator 19 which is connected to the first path at the farthest distance from the input/output terminal 100 among the parallel arm resonators 16 to 19. However, other connections are within the scope of the disclosure.

According to this, signals in a predetermined attenuation band which are transmitted through the filter 10 may be cancelled sufficiently, and the radio frequency module 1 whose size is reduced may be provided.

In addition, for example, the radio frequency modules 1A to 1F according to the embodiment example and the modified examples each include a module substrate 90. Each of the inductors 20, 30, and 40 is formed of a coil conductor having a winding structure, and is disposed on/in the module substrate 90.

According to this, each of the inductors 20, 30, and 40 is formed of a coil conductor having a winding structure, achieving a reduction in size of each of the inductors 20, 30, and 40.

In addition, for example, in the radio frequency modules 1A, 1B, 1C, 1E and 1F, the winding axes of the inductors 20, 30, and 40 are parallel to each other. Assuming the radio frequency modules are each viewed in the direction of the winding axes, the inductor 20 at least partially overlaps the inductor 30, and the inductor 20 at least partially overlaps the inductor 40.

According to this, magnetic field coupling between the inductors 20 and 30 and magnetic field coupling between the inductors 20 and 40 achieve reductions in size of the radio frequency modules 1A, 1B, 1C, 1E and 1F while large mutual inductances are achieved.

In addition, for example, in the radio frequency module 1E, the inductor 20 is disposed in the module substrate 90; the inductor 30 is disposed on the first principal surface; the inductor 40 is disposed on the second principal surface.

According to this, magnetic field coupling between the inductors 20 and 30 and magnetic field coupling between the inductors 20 and 40 achieve a reduction in size of the radio frequency module 1E while large mutual inductances are achieved.

In addition, for example, in the radio frequency module 1D, the winding axes of the inductors 20, 30, and 40 are parallel to each other, and are perpendicular to the principal surfaces of the module substrate 90. The inductor 30 is disposed adjacent to the inductor 20; the inductor 40 is disposed adjacent to the inductor 20.

This achieves a reduction in size of the radio frequency module 1D while large mutual inductances are achieved.

In addition, for example, in the radio frequency modules 1A and 1B, the inductance value L30 of the inductor 30 is greater than the inductance value L40 of the inductor 40. The distance between the inductor 30 and the ground electrode layer disposed closest to the inductor 30 is larger than that between the inductor 40 and the ground electrode layer disposed closest to the inductor 40.

According to this, the surface, on which the inductor 30 whose inductance value is greatest among the inductors 30 and 40 is disposed, is far from the ground electrode layers of the radio frequency modules 1A and 1B, achieving suppression of degradation of the Q value of the inductor 30 due to the ground electrode layers.

In addition, for example, in the radio frequency modules 1A and 1B, the inductors 20, 30, and 40 are included in the semiconductor IC 70.

According to this, the inductors 20, 30, and 40 are formed in the same chip. Thus, the layout relationship between the inductors 20, 30, and 40 may be stabilized without influence of the forming accuracy (such as inclination due to the mounting accuracy or the like) of the radio frequency modules in which the inductors 20, 30, and 40 are formed. In addition, the degrees of magnetic field coupling between the inductor 20 and the inductors 30 and 40 may be stabilized.

In addition, for example, in the radio frequency modules 1A and 1B, the winding diameter of the inductor 20 is larger than that of the inductor 30, and is larger than that of the inductor 40.

In addition, for example, in the radio frequency modules 1A and 1B, the inductors 20, 30, and 40 are disposed in the order of the inductor 30, the inductor 20, and the inductor 40 in the direction of the winding axis of the inductor 20.

According to this, the directions of the winding axes of the inductors 20, 30, and 40 are the same. The inductor 20 is disposed adjacent to the inductor 30. The inductor 20 is disposed adjacent to the inductor 40. Thus, a reduction in size of the semiconductor IC 70 is achieved while large mutual inductances are achieved. In addition, the inductors 30 and 40 are disposed on the different sides of the inductor 20, achieving large areas in which the respective inductors 30 and 40 are formed.

In addition, for example, in the radio frequency modules 1A and 1B, assuming the radio frequency modules are each viewed in the direction of the winding axis, the inductor 30 does not overlap the inductor 40.

According to this, unnecessary magnetic field coupling between the inductor 30 and the inductor 40 may be suppressed.

In addition, for example, in the radio frequency modules 1A to 1F, the filter 10 is formed in the second integrated circuit including a piezoelectric substrate, and the switch is disposed on the module substrate 90 outside the second integrated circuit.

According to this, a reduction in size of the filter 10 is achieved.

In addition, for example, in the radio frequency modules 1A to 1F, the degree of magnetic field coupling between the inductors 30 and 20 is different from that between the inductors 40 and 20.

According to this, the attenuation characteristics of the radio frequency modules 1A to 1F may be changed.

In addition, for example, in the radio frequency modules 1A to 1F, the distance between the inductors 30 and 20 is different from that between the inductors 40 and 20.

According to this, the attenuation characteristics of the radio frequency modules 1A to 1F may be changed.

In addition, for example, in the radio frequency modules 1A to 1F, the inductance value L30 of the inductor 30 is different from the inductance value L40 of the inductor 40.

According to this, the attenuation characteristics of the radio frequency modules 1A to 1F may be changed.

Other Embodiments and the Like

The radio frequency module according to the embodiment of the present disclosure is described above by taking the embodiment, the embodiment example, and the modified examples. The radio frequency module provided by the present disclosure is not limited to the embodiment, the embodiment example, and the modified examples. A different embodiment obtained by combining any components in the embodiment, the embodiment example, and the modified examples, modified examples obtained by making various changes, which are conceived by those skilled in the art without departing from the gist of the present disclosure, on the embodiment, the embodiment example, and the modified examples, and various devices including the radio frequency module are also encompassed in the present disclosure.

For example, in the radio frequency modules according to the embodiment, the embodiment example, and the modified examples, different circuit devices, wiring, and the like may be inserted between paths connecting the circuit devices and the signal paths which are disclosed in the drawings.

The features of the radio frequency module described on the basis of the embodiment will be described below.

<1>

A radio frequency module comprising:
a first input/output terminal and a second input/output terminal;
an acoustic-wave filter that has plural serial arm resonators and one or more parallel arm resonators, the plural serial arm resonators being serially disposed on a first path connecting the first input/output terminal to the second input/output terminal, the one or more parallel arm resonators being connected between the first path and a ground;
a first inductor that is connected to a second path connecting the first input/output terminal or the second input/output terminal to the acoustic-wave filter; and
a parallel arm circuit that is connected between the ground and a first parallel arm resonator among the one or more parallel arm resonators,
wherein the parallel arm circuit includes
a second inductor and a third inductor, and
a switch that has a common terminal, a first selection terminal, and a second selection terminal,
wherein the first selection terminal is connected to a first end of the second inductor,
wherein the second selection terminal is connected to a first end of the third inductor,
wherein the common terminal is connected to either one of the first parallel arm resonator and the ground, and
wherein the second inductor and the third inductor are connected, at second ends thereof, to the other one of the first parallel arm resonator and the ground.

<2>

The radio frequency module according to <1>,
wherein at least one of the second and third inductors is capable of producing magnetic field coupling with the first inductor.

<3>

The radio frequency module according to <1> or <2>,
wherein the first inductor is connected between the second path and the ground.

<4>

The radio frequency module according to any one of <1> to <3>,
wherein the first inductor has an inductance value which is greater than an inductance value of the second inductor and which is greater than an inductance value of the third inductor.

<5>
The radio frequency module according to any one of <1> to <4>,
  wherein the switch switches between connection and disconnection between the common terminal and the first selection terminal, and switches between connection and disconnection between the common terminal and the second selection terminal.
<6>
The radio frequency module according to any one of <1> to <5>,
  wherein the first inductor is connected to the first input/output terminal among the first input/output terminal and the second input/output terminal,
  wherein the one or more parallel arm resonators comprise two or more parallel arm resonators, and
  wherein the first parallel arm resonator is connected to the first path at the farthest distance from the first input/output terminal among the one or more parallel arm resonators.
<7>
The radio frequency module according to <6>,
  wherein the parallel arm circuit is connected only to a parallel arm resonator which is connected to the first path at the farthest distance from the first input/output terminal among the one or more parallel arm resonators. However, other connections are within the scope of the disclosure.
<8>
The radio frequency module according to any one of <1> to <7>, further comprising:
  a module substrate,
  wherein each of the first inductor, the second inductor, and the third inductor is formed of a coil conductor having a winding structure, and is disposed on/in the module substrate.
<9>
The radio frequency module according to <8>,
  wherein the first inductor, the second inductor, and the third inductor have winding axes parallel to each other, and
  wherein, assuming the radio frequency module is viewed in a direction of the winding axes, the first inductor at least partially overlaps the second inductor, and the first inductor at least partially overlaps the third inductor.
<10>
The radio frequency module according to <9>,
  wherein the module substrate has a first principal surface and a second principal surface which are opposite each other,
  wherein the first inductor is disposed in the module substrate,
  wherein the second inductor is disposed on the first principal surface, and
  wherein the third inductor is disposed on the second principal surface.
<11>
The radio frequency module according to <8>,
  wherein the first inductor, the second inductor, and the third inductor have winding axes which are parallel to each other and which are perpendicular to a principal surface of the module substrate,
  wherein the second inductor is disposed adjacent to the first inductor, and
  wherein the third inductor is disposed adjacent to the first inductor.
<12>
The radio frequency module according to any one of <8> to <11>,
  wherein the second inductor has an inductance value greater than an inductance value of the third inductor, and
  wherein a distance between the second inductor and a ground electrode layer disposed closest to the second inductor is larger than a distance between the third inductor and a ground electrode layer disposed closest to the third inductor.
<13>
The radio frequency module according to any one of <8> to <12>,
  wherein the first inductor, the second inductor, and the third inductor are included in a first integrated circuit.
<14>
The radio frequency module according to <13>,
  wherein the first inductor has a winding diameter which is larger than a winding diameter of the second inductor and which is larger than a winding diameter of the third inductor.
<15>
The radio frequency module according to <13> or <14>,
  wherein the first inductor, the second inductor, and the third inductor are disposed in order of the second inductor, the first inductor, and the third inductor in the direction of a winding axis of the first inductor.
<16>
The radio frequency module according to <15>,
  wherein, assuming the radio frequency module is viewed in the direction of the winding axis, the second inductor does not overlap the third inductor.
<17>
The radio frequency module according to any one of <8> to <16>,
  wherein the acoustic-wave filter is formed in a second integrated circuit including a piezoelectric substrate, and
  wherein the switch is disposed on the module substrate outside the second integrated circuit.
<18>
The radio frequency module according to any one of <8> to <17>,
  wherein the degree of magnetic field coupling between the second inductor and the first inductor is different from the degree of magnetic field coupling between the third inductor and the first inductor.
<19>
The radio frequency module according to any one of <8> to <18>,
  wherein a distance between the second inductor and the first inductor is different from a distance between the third inductor and the first inductor.
<20>
The radio frequency module according to any one of <8> to <19>,
  wherein the second inductor has an inductance value different from an inductance value of the third inductor.

The present disclosure may be widely used as a radio frequency module, which is disposed in a frontend unit, in communication devices such as a cellular phone.

What is claimed is:

1. A radio frequency module comprising:
   a first input/output terminal and a second input/output terminal;
   an acoustic-wave filter that has plural serial arm resonators and one or more parallel arm resonators, the plural serial arm resonators being serially disposed on a first path connecting the first input/output terminal to the second input/output terminal, the one or more parallel arm resonators being connected between the first path and a ground;
   a first inductor that is connected to a second path connecting the first input/output terminal or the second input/output terminal to the acoustic-wave filter; and
   a parallel arm circuit that is connected between the ground and a first parallel arm resonator among the one or more parallel arm resonators,
   wherein the parallel arm circuit includes
      a second inductor and a third inductor, and
      a switch that has a common terminal, a first selection terminal, and a second selection terminal,
   wherein the first selection terminal is connected to a first end of the second inductor,
   wherein the second selection terminal is connected to a first end of the third inductor,
   wherein the common terminal is connected to either one of the first parallel arm resonator and the ground, and
   wherein the second inductor and the third inductor are connected, at second ends thereof, to the other one of the first parallel arm resonator and the ground.

2. The radio frequency module according to claim 1, wherein at least one of the second and third inductors is capable of producing magnetic field coupling with the first inductor.

3. The radio frequency module according to claim 1, wherein the first inductor is connected between the second path and the ground.

4. The radio frequency module according to claim 2, wherein the first inductor has an inductance value which is greater than an inductance value of the second inductor and which is greater than an inductance value of the third inductor.

5. The radio frequency module according to claim 1, wherein the switch switches between connection and disconnection between the common terminal and the first selection terminal, and switches between connection and disconnection between the common terminal and the second selection terminal.

6. The radio frequency module according to claim 2, wherein the first inductor is connected to the first input/output terminal among the first input/output terminal and the second input/output terminal,
   wherein the one or more parallel arm resonators comprise two or more parallel arm resonators, and
   wherein the first parallel arm resonator is connected to the first path at the farthest distance from the first input/output terminal among the one or more parallel arm resonators.

7. The radio frequency module according to claim 6, wherein the parallel arm circuit is connected only to a parallel arm resonator which is connected to the first path at the farthest distance from the first input/output terminal among the one or more parallel arm resonators.

8. The radio frequency module according to claim 7, further comprising:
   a module substrate,
   wherein each of the first inductor, the second inductor, and the third inductor is formed of a coil conductor having a winding structure, and is disposed on/in the module substrate.

9. The radio frequency module according to claim 8, wherein the first inductor, the second inductor, and the third inductor have winding axes parallel to each other, and
   wherein, assuming the radio frequency module is viewed in a direction of the winding axes, the first inductor at least partially overlaps the second inductor, and the first inductor at least partially overlaps the third inductor.

10. The radio frequency module according to claim 9, wherein the module substrate has a first principal surface and a second principal surface which are opposite each other,
    wherein the first inductor is disposed in the module substrate,
    wherein the second inductor is disposed on the first principal surface, and
    wherein the third inductor is disposed on the second principal surface.

11. The radio frequency module according to claim 8, wherein the first inductor, the second inductor, and the third inductor have winding axes which are parallel to each other and which are perpendicular to a principal surface of the module substrate,
    wherein the second inductor is disposed adjacent to the first inductor, and
    wherein the third inductor is disposed adjacent to the first inductor.

12. The radio frequency module according to claim 8, wherein the second inductor has an inductance value greater than an inductance value of the third inductor, and
    wherein a distance between the second inductor and a ground electrode layer disposed closest to the second inductor is larger than a distance between the third inductor and a ground electrode layer disposed closest to the third inductor.

13. The radio frequency module according to claim 8, wherein the first inductor, the second inductor, and the third inductor are included in a first integrated circuit.

14. The radio frequency module according to claim 13, wherein the first inductor has a winding diameter which is larger than a winding diameter of the second inductor and which is larger than a winding diameter of the third inductor.

15. The radio frequency module according to claim 13, wherein the first inductor, the second inductor, and the third inductor are disposed in order of the second inductor, the first inductor, and the third inductor in the direction of a winding axis of the first inductor.

16. The radio frequency module according to claim 15, wherein, assuming the radio frequency module is viewed in the direction of the winding axis, the second inductor does not overlap the third inductor.

17. The radio frequency module according to claim 8, wherein the acoustic-wave filter is formed in a second integrated circuit including a piezoelectric substrate, and
    wherein the switch is disposed on the module substrate outside the second integrated circuit.

18. The radio frequency module according to claim 8, wherein the degree of magnetic field coupling between the second inductor and the first inductor is different from the degree of magnetic field coupling between the third inductor and the first inductor.

19. The radio frequency module according to claim 18, wherein a distance between the second inductor and the first inductor is different from a distance between the third inductor and the first inductor.

20. The radio frequency module according to claim 18, wherein the second inductor has an inductance value different from an inductance value of the third inductor.

* * * * *